United States Patent
Udell et al.

(10) Patent No.: US 7,191,219 B2
(45) Date of Patent: *Mar. 13, 2007

(54) SELF-DESTRUCTING DOCUMENT AND E-MAIL MESSAGING SYSTEM

(75) Inventors: Howard R. Udell, Westport, CT (US); Cary S. Kappel, New York, NY (US); William Ries, North Brunswick, NJ (US); Stuart D. Baker, New York, NY (US); Greg M. Sherman, New York, NY (US)

(73) Assignee: Clarios Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,979

(22) Filed: Aug. 12, 2002

(65) Prior Publication Data

US 2003/0126215 A1 Jul. 3, 2003

Related U.S. Application Data

(63) Continuation of application No. 09/098,204, filed on Jun. 16, 1998, now abandoned.

(60) Provisional application No. 60/049,853, filed on Jun. 17, 1997.

(51) Int. Cl.
*G06F 15/16* (2006.01)

(52) U.S. Cl. ..................... 709/206; 709/201

(58) Field of Classification Search ............... 709/200, 709/206, 213, 232, 201, 224, 203, 229, 246; 707/10, 200, 202; 713/200; 714/38; 358/450; 345/619; 235/462; 705/53, 65; 379/91; 703/17; 715/515; 382/115; 380/277
See application file for complete search history.

(56) References Cited

U.S. PATENT DOCUMENTS 4,796,220 A 1/1989 Wolfe
4,827,508 A 5/1989 Shear (Continued)

OTHER PUBLICATIONS

Hansen, Enhancing documents with embedded program; IEEE 1990.*

(Continued)

*Primary Examiner*—Thong Vu
(74) *Attorney, Agent, or Firm*—Davidson, Davidson & Kappel, LLC

(57) ABSTRACT

A self-destruction document or e-mail massaging system is provided that automatically destroys documents or e-mail messages at a predetermined time by attaching a "virus" to the document or e-mail message. A virus in the form of a Trojan horse is attached to file (such as an e-mail message or document) when it is created. The virus contains a portion of executable code or an executable program which instructs the computer to overwrite and/or delete the file to which the virus is attached at a desired time. Since the virus is attached to the file, it will travel with the file even when the file is copied, forwarded, or saved to disks or tape drives.

24 Claims, 13 Drawing Sheets

U.S. PATENT DOCUMENTS

| | | | |
|---|---|---|---|
| 4,899,299 A | | 2/1990 | MacPhail ................... 364/570 |
| 5,003,575 A | | 3/1991 | Chamberlin et al. |
| 5,051,891 A | * | 9/1991 | MacPhail ................... 707/200 |
| 5,200,999 A | * | 4/1993 | Matyas et al. .............. 380/277 |
| 5,278,955 A | * | 1/1994 | Forte et al. ................. 709/206 |
| 5,357,563 A | * | 10/1994 | Hamilton et al. ........ 379/91.01 |
| 5,364,132 A | | 11/1994 | Haas et al. |
| 5,410,598 A | * | 4/1995 | Shear ......................... 705/53 |
| 5,438,430 A | * | 8/1995 | Mackinlay et al. ......... 358/450 |
| 5,485,575 A | * | 1/1996 | Chess et al. .................. 714/38 |
| 5,586,036 A | | 12/1996 | Pintsov ................ 364/464.02 |
| 5,613,012 A | * | 3/1997 | Hoffman et al. ............ 382/115 |
| 5,619,656 A | * | 4/1997 | Graf ............................. 709/224 |
| 5,623,600 A | | 4/1997 | Ji et al. ................. 395/187.01 |
| 5,647,002 A | | 7/1997 | Brunson ...................... 380/49 |
| 5,689,699 A | | 11/1997 | Howell et al. .............. 395/609 |
| 5,710,883 A | * | 1/1998 | Hong et al. ................. 709/246 |
| 5,748,740 A | * | 5/1998 | Curry et al. ................... 705/65 |
| 5,761,684 A | * | 6/1998 | Gibson ....................... 715/515 |
| 5,771,355 A | * | 6/1998 | Kuzma ....................... 709/232 |
| 5,781,901 A | | 7/1998 | Kuzma ....................... 707/10 |
| 5,786,817 A | * | 7/1998 | Sakano et al. .............. 345/619 |
| 5,787,247 A | | 7/1998 | Norin et al. ............. 395/200.5 |
| 5,794,005 A | * | 8/1998 | Steinman ..................... 703/17 |
| 5,805,702 A | | 9/1998 | Curry et al. ................... 380/24 |
| 5,809,242 A | | 9/1998 | Shaw et al. ............ 395/200.47 |
| 5,818,447 A | | 10/1998 | Wolf et al. .................. 345/335 |
| 5,826,022 A | | 10/1998 | Nielsen ................. 395/200.36 |
| 5,832,208 A | | 11/1998 | Chen et al. ............ 395/187.01 |
| 5,832,514 A | * | 11/1998 | Norin et al. ................. 707/202 |
| 5,848,419 A | | 12/1998 | Hapner et al. .............. 707/103 |
| 5,867,281 A | | 2/1999 | Nozoe et al. ................ 258/402 |
| 5,889,943 A | | 3/1999 | Ji et al. ................. 395/187.01 |
| 5,903,723 A | * | 5/1999 | Beck et al. .................. 709/200 |
| 5,905,248 A | * | 5/1999 | Russell et al. ......... 235/462.15 |
| 5,923,846 A | * | 7/1999 | Gage et al. .................. 709/213 |
| 5,930,514 A | | 7/1999 | Thompson et al. |
| 5,953,528 A | | 9/1999 | Sullivan ..................... 395/703 |
| 5,958,005 A | | 9/1999 | Thorne et al. .............. 709/202 |
| 5,978,579 A | | 11/1999 | Buxton et al. .............. 395/701 |
| 5,978,917 A | | 11/1999 | Chi .............................. 713/201 |
| 6,006,328 A | * | 12/1999 | Drake ......................... 713/200 |
| 6,029,175 A | | 2/2000 | Chow et al. |
| 6,044,205 A | * | 3/2000 | Reed et al. .................. 709/201 |
| 6,085,224 A | * | 7/2000 | Wagner ....................... 709/203 |
| 6,088,720 A | | 7/2000 | Berkowitz et al. |
| 6,119,229 A | | 9/2000 | Martinez et al. |
| 6,144,960 A | * | 11/2000 | Okada et al. .................. 707/10 |
| 6,279,112 B1 | | 8/2001 | O'Toole et al. |
| 6,301,245 B1 | | 10/2001 | Luzeski et al. |
| 6,304,640 B1 | * | 10/2001 | Darland et al. ........ 379/114.03 |
| 6,324,569 B1 | | 11/2001 | Ogilvie et al. |
| 6,366,928 B1 | * | 4/2002 | Davy .......................... 707/200 |
| 6,721,784 B1 | | 4/2004 | Leonard et al. |
| 6,732,179 B1 | * | 5/2004 | Brown et al. ................ 709/229 |

OTHER PUBLICATIONS

Customization Of Network Surveillance Expert Systems—Bieszczad, White (1992) ; ftp.sce.carleton.ca/pub/netmanage/globcom.ps.gz.*

Interleaf Active Documents—English, Tenneti (1994) cajun.cs.nott.ac.uk/wiley/journals/epobetan/pdf/volume7/issue2/ep114pe.pdf.*

Eudora v1.5.2 Configuration; www.uvi.edu/Tutorials/Eudora/attach.htm.*

Message Composition Commands alexia.lis.uiuc.edu/manual/inet/email/pine/basic/compose_cmds.html.*

IP Next Generation Overview; www.isoc.org/HMP/PAPER/PT1/html/paper.html.*

Article, *Microsoft Word Document macro viruses,* May 15, 1997, pp. 1-7.

Article, Wall Street Journal, Alex Markels, *The Messy Business of Culling Company Files,* May 22, 1997; pp. B1-B2.

Article, Harvest User's Manual, Darren R. Hardy & Michael F. Schwartz, *Effective Use of Internet Information,* Nov. 3, 1994, pp. 1-42.

Article, Harvest Indexer FAQ, pp. 1-11.

Article, Fortune Business Report, Geffrey Colvin, *Shredder,* Jul. 17, 1998.

Gabber et al., Curbing Junk E-Mail via Secure Classification, Proc. of Second International Conference on Financial Cryptography, Anguila, British Virgin Islands, Feb. 1998.

Martinez, Adaptive Self-Organizing Concurrent Systems -Martinez, Progress in Neural Networks, vol. 1, ch 5, pp. 105-126, O. Omidvar (ed), Ablex Publishing, 1990.

Skyt, Managing Aging Data in Temporal Databases and Data Warehouses—Vacuuming and Persistent Views, Proceedings of EDBT 2000 Ph.D. Workshop, Konstanz, Germany, Mar. 2000.

Bauer, Machine Learning for User Modeling and Plan Recognition, German Research Center for Artificial Intelligence (DFKI), in V. Moustakis & J. Hermann (Eds.), Working Notes of the Proceedings of the ICML '96 Workshop "Machine Learning meets Human Computer Interaction", pp. 5-16, 1996.

* cited by examiner

Prompt user to make document on SDD

Prompt user to enter destruction parameters

Notice following destruction

Prompt user to make document an SDD

Prompt user to enter destruction parameters

Notice following destruction

Warning whenever message is opened

Notice after message destruction

Contents of message following destruction ns of this application is a continuation of U.S. patent application Ser. No. 09/098,204, filed on Jun. 16, 1998, now abandoned the entire disclosure of which is hereby incorporated by reference.

This application claims priority of U.S. Provisional Application Ser. No. 60/049,853, entitled Self-destruction Document and E-mail Massaging System, filed Jun. 17, 1997, the entire disclosure of which is hereby incorporated by reference.

SELF-DESTRUCTING DOCUMENT AND E-MAIL MESSAGING SYSTEM

This application is a continuation of U.S. patent application Ser. No. 09/098,204, filed on Jun. 16, 1998, now abandoned the entire disclosure of which is hereby incorporated by reference.

This application claims priority of U.S. Provisional Application Ser. No. 60/049,853, entitled Self-destruction Document and E-mail Massaging System, filed Jun. 17, 1997, the entire disclosure of which is hereby incorporated by reference.

FIELD OF THE INVENTION

The present invention relates to the field of electronically created documents, including electronic mail ("e-mail") massaging, and to the field of document retention and deletion.

BACKGROUND OF THE INVENTION

E-mail massaging systems are widely used by businesses and individuals throughout the world. E-mail systems allow a user to send electronic messages to other users, and to receive electronic messages from other users. An e-mail system can be configured to provide massaging services to users connected to a local area network (LAN), and can be configured to allow users to send/receive messages to/from users outside the LAN via an external network such as the Internet. E-mail systems also allow users to save, copy, and forward messages received over the e-mail system.

The ease with which e-mail systems allow users to save, copy, and forward messages has had the unintended consequence of hampering document retention policies. Typically, a document retention policy is implemented by a business to insure that documents generated or received by the business are retained for a specified period of time and then destroyed. Moreover, different document retention periods may be specified for different types of documents. One of the goals of a document retention policy is to provide a systematic method for retaining and destroying documents so that the business can identify with some certainty which classes of documents from a given time period still exist.

An effective document retention policy is also valuable in the context of litigation. In such a context it is important that a business has a consistent policy regarding the retention and destruction of documents, and that the business implements this policy. For example, if a business' document retention policy states that letters are to be retained for a period of three years, and if it consistently follows this policy, it will be less vulnerable to a charge that a particular 5-year-old letter was destroyed because the letter was harmful to the business' litigation position. In addition, if the document retention policy is not consistently followed, and only some documents from a particular time period are discarded, it is possible that the remaining documents will provide an incomplete or inaccurate picture of events occurring during that time.

Systems that enforce document retention policies with regard to computer files are well known. Typically, these systems periodically scan the files in the network and delete files which were created prior to a specified date. Since such systems operate on a network, however, they cannot delete files which are stored on the hard drives of individual computers. In order to access these files, a document retention program must be installed on each individual computer. However, even if the document retention system is installed on each individual computer, the system will still be unable to delete files that are stored on floppy disks or other external media. Moreover, these systems cannot delete files which have been transferred to computers outside of the network via e-mail. Thus, for example, files which have been transferred to an employee's home computer or laptop, or to a third party, will not be deleted by conventional document retention systems.

SUMMARY OF THE INVENTION

In accordance with a first embodiment of the present invention, a self-destruction document and e-mail massaging system is provided that automatically destroys documents or e-mail messages at a predetermined time by attaching an executable module such as a "virus" to the document or e-mail message.

Computer viruses are well known. Generally, a computer virus is a portion of executable code or program which attaches itself to a host file. For example, "appending viruses" operate by attaching themselves to the end of a host program and causing the host program to execute the virus code prior to execution of the host program. In contrast "prepending viruses" attach themselves to the beginning of the host program. Other types of viruses are located in interior portions of the host program. Another classes of viruses are known as "macro" viruses. These viruses are macros embedded in text documents which can be configured to execute whenever the document is opened, created, or saved. Typically, the term Trojan horse is used to refer to a virus which remains with its host file or program, and does not travel to other files or programs.

In accordance with the first embodiment of the present invention, an executable module in the form of a Trojan horse is attached to a file (such as an e-mail message or document) when it is created. The executable module contains a portion of executable code or an executable program which instructs the computer to overwrite and/or delete the file to which the executable module is attached at a desired time. In this manner, the executable module sets a limit on the lifetime of the document or e-mail message. Since the executable module is attached to the file, it will travel with the file even when the file is copied, forwarded, or saved to disks or tape drives.

In accordance with a further aspect of the first embodiment of the invention, the executable module executes each time that a file to which it is attached is opened. The executable module determines whether a condition precedent to file deletion has been met. If the condition precedent is met, the executable module instructs the computer to overwrite the file with null data, and then to save, close or delete the file.

In this manner, the present invention provides a number of advantages over prior art systems. For example, since the executable module is attached to the file and is executed whenever the file is opened, the system according to the present invention can enforce a document retention policy even if the file has been stored on external media such as floppy disks, or on a non-network computer. This is because the executable module travels with the file, and is executed whenever, and wherever, the file is opened.

In accordance with a second embodiment of the present invention, a self destruction e-mail massaging system is provided which automatically attaches an executable module to each e-mail message or e-mail message attachment which is created. The executable module contains a portion of executable code or an executable program which instructs the computer to overwrite and/or delete the message (and/or message attachment) to which the executable module is attached at a desired time. The executable module travels with the message as the message is transmitted to its addressee because the executable module is attached to the message. Moreover, the executable module remains attached to the message even when the message is copied, forwarded to another addressee, or saved to disks or other external media.

In accordance with a third embodiment of the present invention, a document security system includes a virtual container into which one or more digital objects are "placed." In this regard, the term "digital object" is used broadly, and includes documents (such as spreadsheets, charts/graphs, word processor documents, ASCII text files, images, and other data files), programs, and anything else which can be stored on a computer.

The document security system includes a container creator and a container opener. The container creator and the container opener are implemented in one or more software programs which are executed on a computer. The container opener allows a user to set a limit on the valid lifetime of the digital objects in the container. These "lifetime controls" may include, for example, an expiration date, an expiration date and time, a fixed number of times in which the document can be opened, or other limits. When the container is opened by the container opener, the container opener checks the lifetime controls. If they are valid, the digital objects contained within the container are accessible for display or execution by the user. If, however, the lifetime controls are invalid, the container opener will immediately destroy the digital object.

An advantage of the document security system including the container creator and the container opener is that, in certain environments, it provides a more robust enforcement of lifetime controls than a self-destruction document containing an executable module. This is because the ability of current word processing and spreadsheet programs to execute an executable module varies widely from product to product. Therefore, for example, a self-destruction document which includes an executable module which is executable by Microsoft Word™ will not self destruct if opened, for example, as a simple ASCII file which is not configured to recognize and execute the executable module. In contrast, with the document security system, the documents are secured within a container which is opened by the container opener, and the container opener, when used, can enforce the lifetime controls against any document in the container, regardless of its type.

In accordance with a further aspect of the document security system in accordance with the third embodiment of the present invention, each digital object within the container may have independent lifetime controls. In accordance with this feature, when a single object within the container expires, it can be destroyed, while the other objects remain intact.

In accordance with still another embodiment of the document security system, the digital object is a self-destruction document created in accordance with the first or second embodiments of the present invention.

In accordance with a still further aspect of this embodiment, the container, its contents, and its lifetime controls can be secured against a user who wishes to subvert the security system. This security is effected through the use of encryption technology. Specifically, the container creator is configured to encrypt the objects within the container, and the container opener is configured to decrypt the objects. In this manner, if a user opens one of the objects without utilizing the container opener, the object will be unreadable.

In accordance with a further aspect of the first and second embodiments, the self-destruction document or e-mail message is encrypted, either by the executable module or by another utility, and the executable module is configured to decrypt the document or e-mail message only if the lifetime of the document or e-mail message has not expired.

In accordance with another embodiment of the present invention, a self-destruction document is created by embedding a plurality of executable modules into a document or e-mail message, wherein each module is executable by a different word processing or e-mail system. For example, a document could include a first module which is executable by a first system and a second module which is executable by a second system. The document itself could be a document native to either system. In accordance with this embodiment, the lifetime controls for the document will be enforced regardless of whether it is opened in the first system or the second system.

In accordance with another embodiment of the invention, an Internet commerce system is provided which employs the virtual containers. In accordance with this embodiment, a party who wishes to sell an electronically transmittable product over the Internet places the product into a virtual container using a container creator utility which encrypts the product and sets lifetime controls for the product. A potential buyer of the product who wishes to sample the product prior to purchasing it, obtains a copy of the container along with an container opener utility from the seller. The container opener utility allows the potential buyer to view and use the product only until a preselected expiration date. The container opener does not, in this embodiment, allow the user to remove the product from the virtual container. In accordance with a preferred aspect of this embodiment, the product is deleted by the container opener if the container is opened after the expiration date. In accordance with yet another aspect of this embodiment, if the seller receives payment for the product prior to the expiration date, the seller will transmit a unique key to the buyer. The container opener could be configured to release the product from the container upon receiving the key.

BRIEF DESCRIPTION OF THE DRAWINGS

FIGS. 7(a) through 7(e) illustrate a graphical user interface for a self-destruction e-mail message in accordance with an embodiment of the present invention which is implemented in Microsoft Outlook™.

DETAILED DESCRIPTION OF THE PREFERRED EMBODIMENTS

Figure 1:
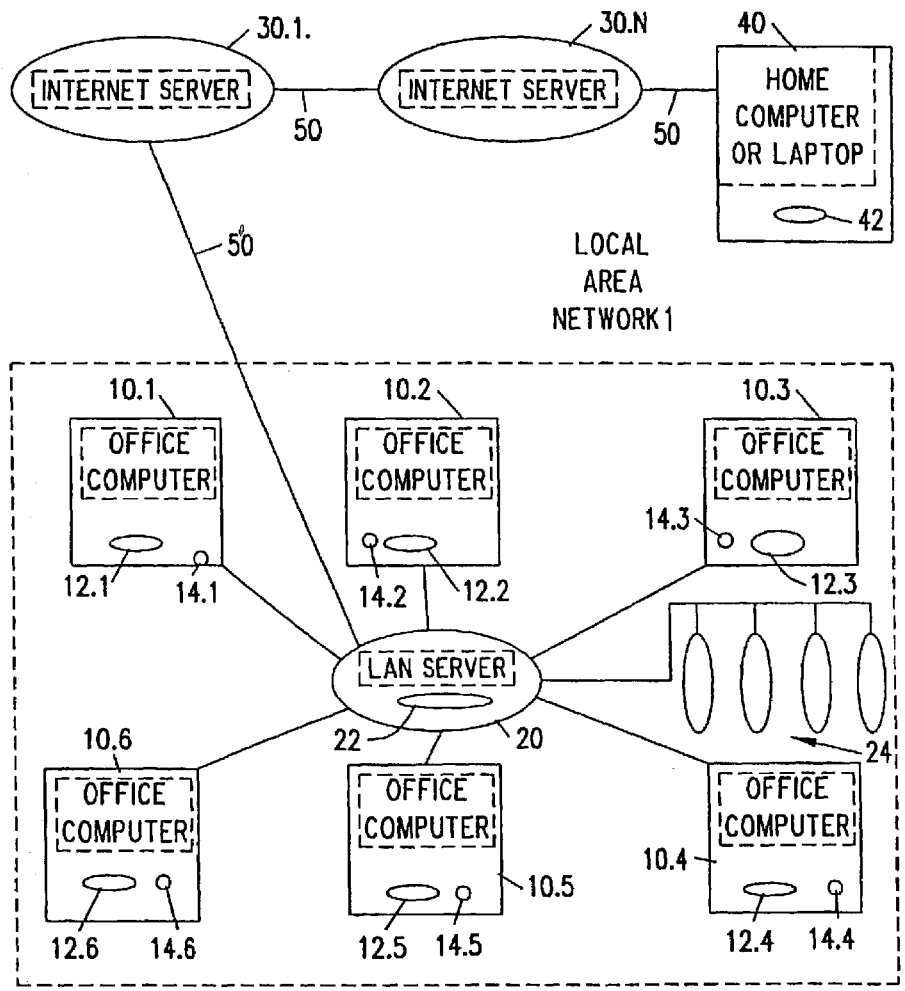
FIG. 1 shows an illustrative prior art environment in which the present invention can be implemented.

FIG. 1 shows an illustrative prior art environment in which the present invention can be utilized. A local area network 1 (LAN 1) includes a plurality of office computers 10.1–10.6 (hereinafter referred to collectively as computers 10) and a server 20. Each computer 10 includes a respective primary storage facility 12 (such as a hard drive) and a respective secondary storage facility 14 (such as a floppy disk or CD Rom drive). The server 20 similarly includes a primary network storage facility 22 (such as a hard drive) and a secondary network storage facility 24 (such as a tape or CD Rom drive). The data on the primary and secondary network storage facilities 22, 24 is shared in that it can be accessed by all of the computers 10. In contrast, the data on the primary and secondary storage facilities 12, 14 of each computer 10 is private in that it is accessed only by its respective computer 10. The server 20 provides Internet access to out-of-network computers, such as home computer 40, via transmission lines 50. Home computer 40 includes a primary storage facility 42 and a secondary storage facility 44. The LAN 1 supports an electronic mail massaging service which allows each computer 10 to send messages within the LAN 1 to other computers 10 and to send messages outside the LAN 1 to out of network computers such as home computer 40. The configuration shown in FIG. 1 is illustrative of typical LANs which are often used in businesses. As one of ordinary skill in the art will appreciate, however, the present invention may be implemented with a variety of network configurations. Moreover, the e-mail massaging system of the present invention is equally applicable to non-network applications in which, for example, e-mail messages are sent and received by a stand-alone computer via a modem or other connection. In addition, the document retention and deletion features of the present invention may be implemented on a stand-alone computer, with or without a modem or other connection to external computers.

Some of the document retention and destruction problems which can be alleviated in accordance with the present invention will now be explained with reference to the configuration of FIG. 1.

For purposes of illustration, assume that local area network 1 is installed in a business which has adopted a document retention policy that requires that documents which are more than two years old be destroyed. Typically, such a document retention policy will be implemented by installing a program on the server 20 which periodically scans the primary network storage facility 22, and deletes documents which have a creation date which is more than two years earlier than the current scanning date. One of the problems with a program of this type is that it fails to adequately account for copies of the documents which are not stored in the network storage facilities.

For example, assume user-1 creates a document on computer 10.1, and stores it on the network storage facility 22. Then, a week later, user-1 copies the document onto the hard drive 12.1 of computer 10.1, and onto a floppy disk via the secondary storage facility 14.1. Moreover, since the document is on the primary network storage facility 22, user-2, may, without the knowledge of user-1, copy the document onto primary storage facility 12.2 of computer 10.2, and onto another floppy disk via the secondary storage facility 14.2. In this manner, five copies of the document have been created, only one of which can be accessed and deleted by the network document retention program.

The above-referenced problem is further complicated by the fact that the LAN of FIG. 1 provides electronic massaging services. As a result, user-1 can create an e-mail message and send it outside of the LAN to computer 40 via Internet servers 30. Moreover, previously created document files can be inserted into e-mail messages as attachments. This creates additional problems. For example, the e-mail messages and their attachments may be sent outside of the LAN to third parties who are not aware of the business's document retention policy. In any case, even if the e-mail is merely sent to an employee's home computer, the home computer will not be accessed by the network document retention program.

Typically, enforcement of document retention policies with regard to documents which are not stored on network storage facilities requires each employee to search each directory of their individual hard drives, as well as each of their floppy disks or other secondary storage mediums. In addition, due to the ability of the e-mail system to include documents as attachments to e-mail messages, older documents may be hidden in recent e-mail messages, making these documents difficult to identify and delete. The employees must also be required to search their laptops and home computers for business files. Moreover, even if each employee is diligent in performing these time-consuming tasks, there will remain the possibility that documents continue to exist on third party computers.

Another problem associated with the implementation of a document retention policy is that conventionally, when a document is deleted from a storage medium, the document itself is not removed. Instead, the computer merely removes the pointer to the document which indicates the document's location in the storage medium. The document itself remains in the storage medium until the computer overwrites it with another document. Consequently, for employees to insure that a document is actually deleted, they must overwrite the document with null characters and then delete the document, further increasing the time associated with enforcing the document retention policy.

Executable Modules Embedded in a Document or E-Mail Message

Figure 2:
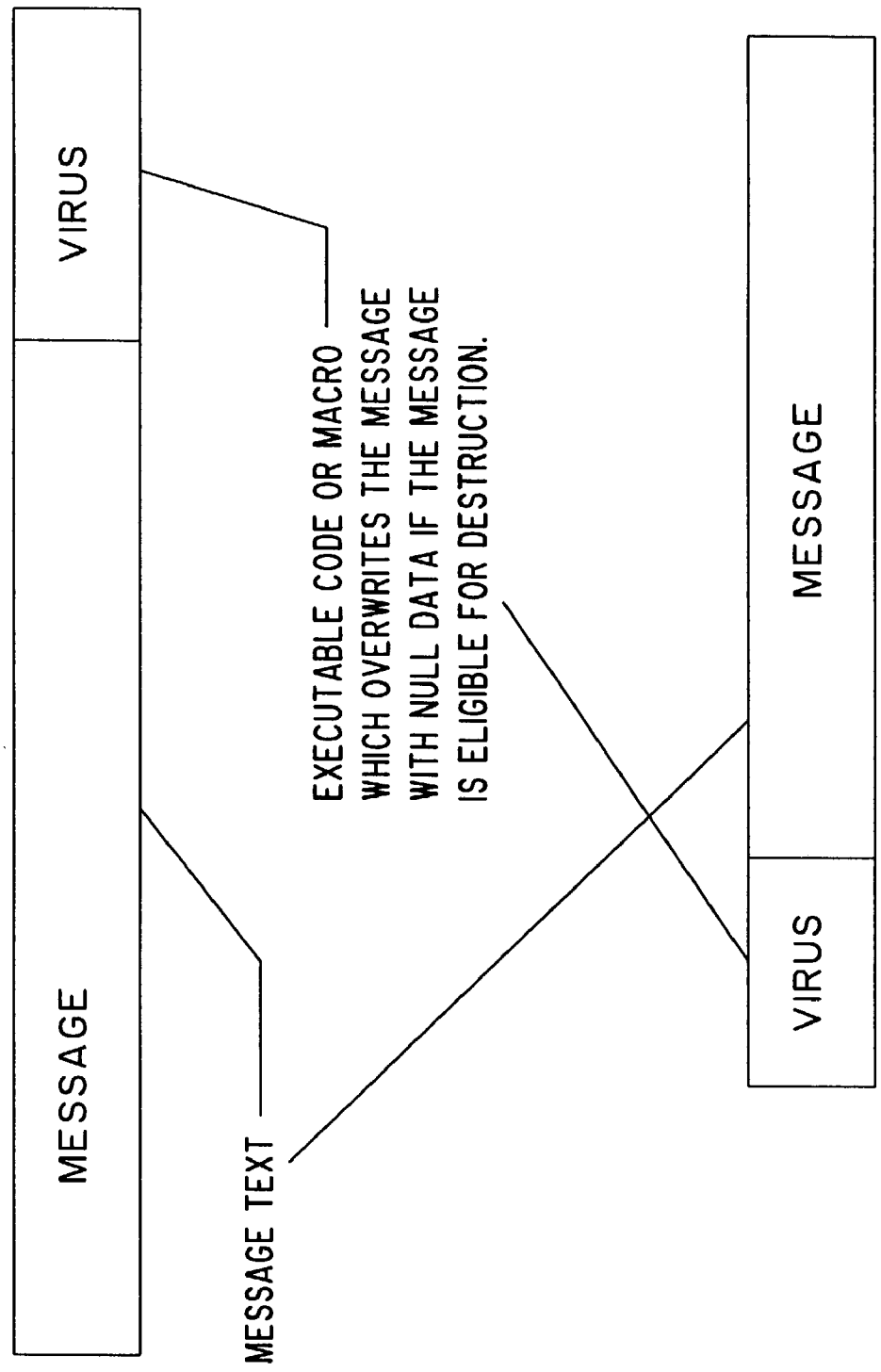
FIG. 2 shows e-mail messages in accordance with the present invention which include pre-pending and appending viruses, respectively.

In accordance with the present invention, a self-destruction document system is provided which attaches an executable module to a document. In accordance with another embodiment of the present invention, a self destruction e-mail massaging system is provided which attaches an executable module to an electronic message or message attachments when the message or message attachment is created. The executable module can be attached to the message or document in any known manner. For example, referring to FIG. 2, the executable module can be attached as a prepending virus, as an appending virus, or in any known manner. The module itself can be created in any known manner by utilizing, for example, assembly languages, higher level programming languages, or macros. The attached executable module causes the document or message to self-destruct once a predetermined condition is met. In this manner, the executable module sets "lifetime controls" which control the lifetime of the document. In the above-referenced illustration, for example, the executable module would be programmed to delete the document or message to which it is attached if the current date was more than two years later than the creation date of the document or message. In accordance with a further embodiment of the present invention, the executable module would overwrite the document or message to which it is attached with null characters (e.g., all "X"'s) prior to deleting the document or message.

In accordance with further embodiments of the present invention, the overwriting and/or deleting of the document or message may be predicated on the occurrence of other or additional conditions. For example, the system could be configured to overwrite and/or delete the message or document when the document i) is closed, or ii) is opened for a second time, thereby creating a document which can be read only one time before it is destroyed. Alternatively, the system could be configured to overwrite and/or delete the message or document when an attempt to copy, forward, or print the message or document is made. Moreover, the system could be configured to block any attempt to print or copy the message or document thereby creating a document which can be viewed, but not printed. These additional lifetime controls could also be triggered by an event, so that the print or copy block is lifted if a password or key is input, or so that the print or copy block is imposed after a predetermined time period or other event.

In accordance with another embodiment of the present invention, the system could allow a LAN administrator to predetermine the overwrite/delete condition(s) so as to impose a document retention policy on all system users, and on all documents or messages created by system users. Similarly, the system could be configured to allow each user to choose whether a particular document or message includes an overwrite/delete condition. Moreover, the user could be allowed to choose from a variety of overwrite/delete conditions. This could be implemented, for example, through a tools menu.

An exemplary method for implementing a self-destruction electronic document or providing a self-destruction electronic massaging system will now be described. While the illustrative embodiment described herein is illustrated for Microsoft Word™, Microsoft Excel™, and Microsoft Outlook™ environments, one of ordinary skill in the art will appreciate that the present invention may be implemented in a variety of environments and in a variety of ways.

Figure 3:
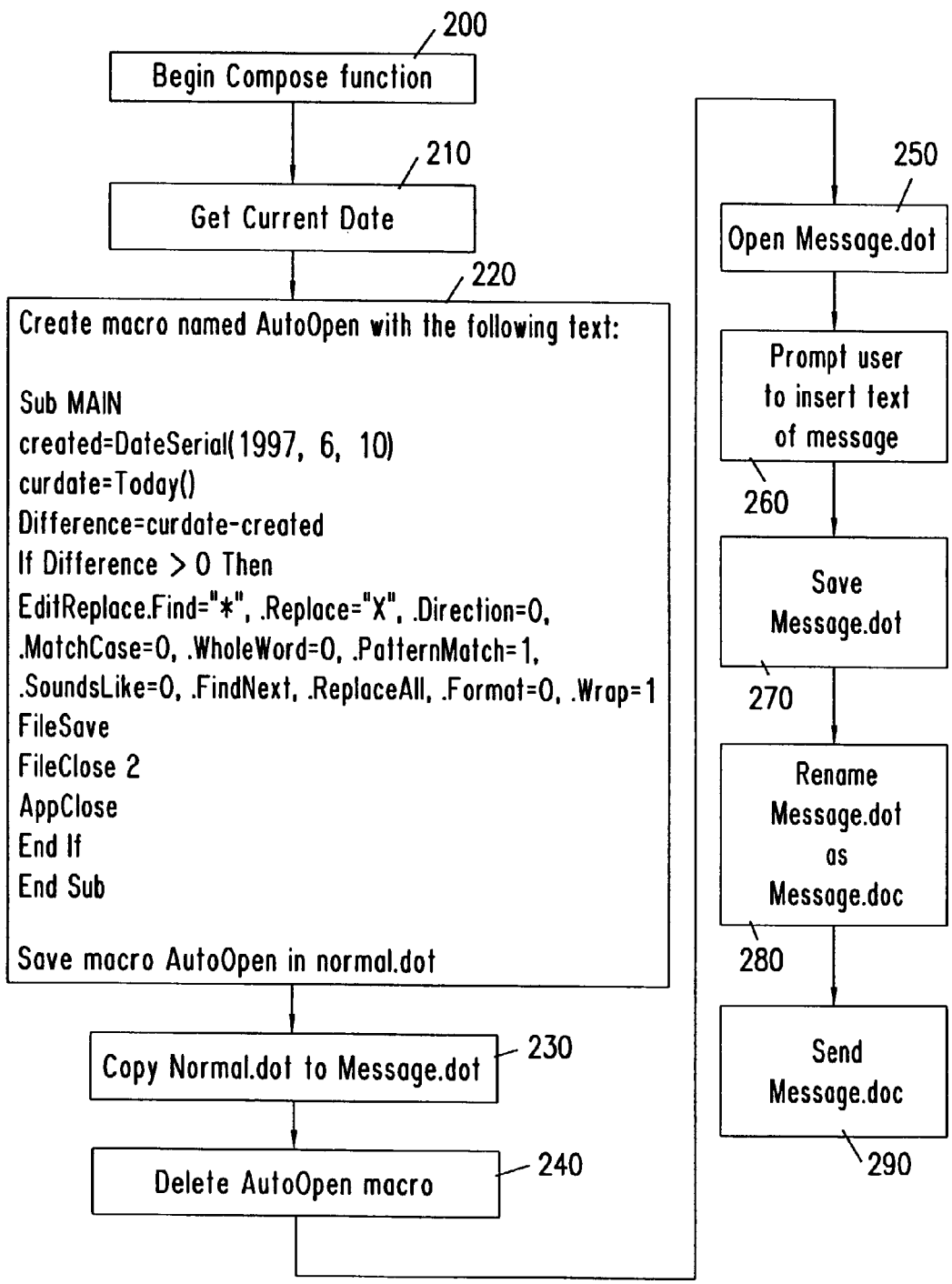
FIG. 3 is a flow chart of an illustrative method for creating a self-destruction e-mail message in accordance with an illustrative embodiment of the present invention.
Figure 4:
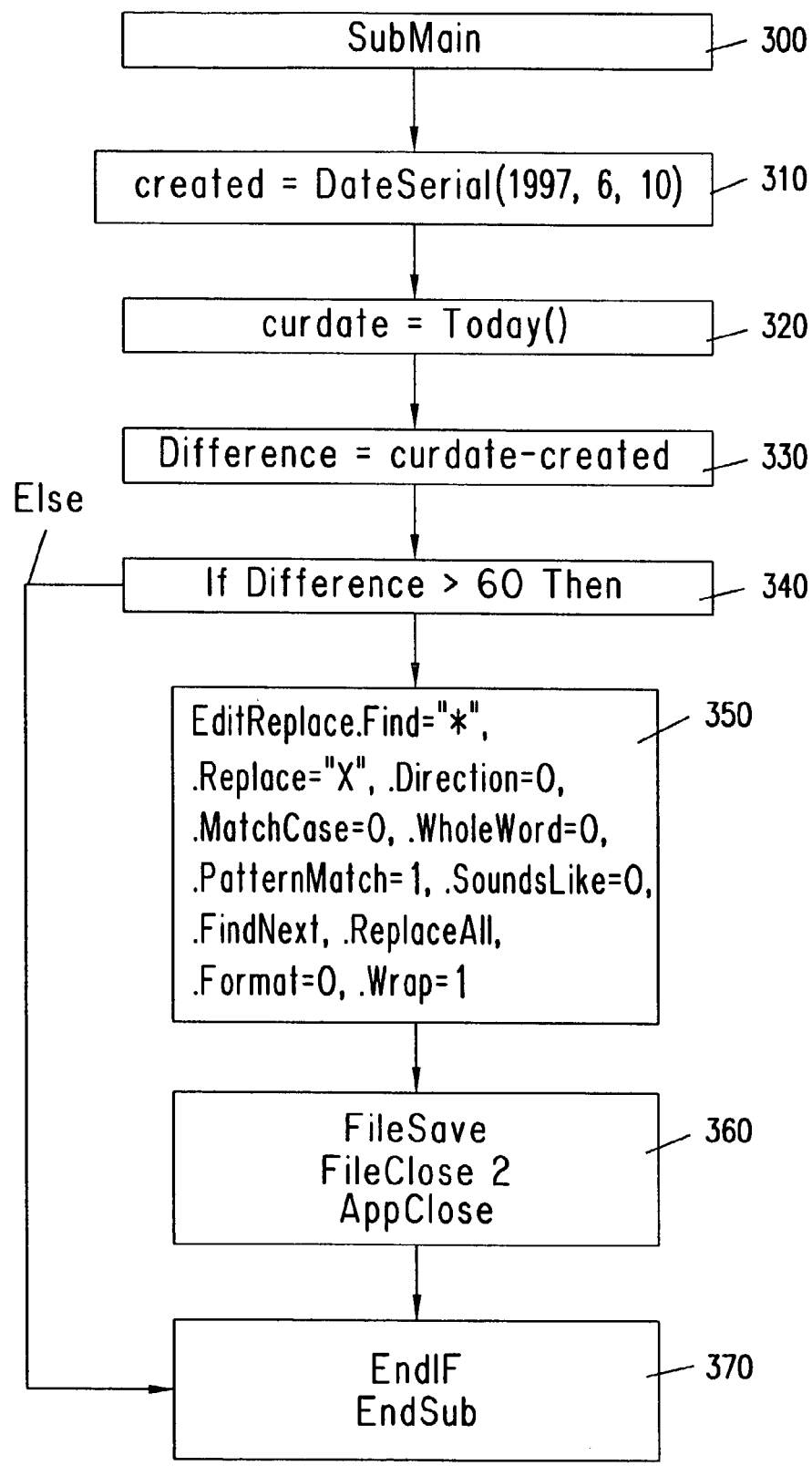
FIG. 4 is a flow chart of a macro virus which is embedded in the self-destruction e-mail message of FIG. 3.

FIGS. 3 and 4 illustrate the implementation of a self-destruction electronic massaging system for Microsoft Word™ 6.0 documents. Referring to FIG. 3, at step 200, a user initiates the creation of a document or message on, for example, office computer 10.1 of FIG. 1. At step 220, the system creates an "AutoOpen" macro and saves the macro in the "Normal.dot" file. In accordance with the Microsoft Word™ architecture, a macro created with the title AutoOpen will execute each time a Word document is opened. The instructions referenced at step 220, which are written in the WordBasic™ programming language, are saved as an AutoOpen macro in the normal.dot template file. Normal.dot is a template which is designated by the Word™ program as a storage file for global macros. At step 230, the normal.dot file, which includes the AutoOpen macro, is copied to a file named "message.dot." Then, at step 240, the AutoOpen macro is deleted from the normal.dot file. At steps 250–260, the message.dot file is opened and the user is prompted to insert the text of the document or message. Then, at steps 270, the message.dot file, which now includes the document or message as well as a copy of the normal.dot file, is saved. The copy of the normal.dot file, in turn, includes the AutoOpen macro. At steps 280–290, the message.dot file is renamed message.doc, and then sent as an electronic mail message or electronic mail message attachment.

The electronic mail message is sent, for example, over the Internet to Home Computer 40 via LAN server 20 and Internet servers 30. The AutoOpen macro, which is embedded in the message.doc file, will execute when the file message.doc is opened by the addressee of the message. FIG. 4 is a flow chart for the AutoOpen macro which is embedded in the message.doc file. At step 310, the DateSerial( ) function returns a serial value representative of the creation date of the message as the variable "created." The argument for the function DateSerial is set at the time the AutoOpen macro is created (steps 210 and 220 of FIG. 3), and has been arbitrarily indicated as Jun. 10, 1997 in FIGS. 3 and 4. At step 320, the Today( ) function returns a serial value representative of the current date as the variable "curdate". The serial values returned by these functions are integers between 1 and 802074, with 1 corresponding to Dec. 31, 1899 and 802074 corresponding to Dec. 31, 4095. At step 330, the variable "difference" is set as the difference between the "curdate" and "created." Consequently, the variable "difference" is equal to the number of days which have elapsed between the creation of the message.doc file and the current date in which the document has been opened.

Steps 340 through 360 constitute an "If, Then" Statement which determines whether the time elapsed between the creation date and the current date has exceeded a predetermined threshold. For purposes of illustration, the threshold has been set at 60 days. At step 340, the variable "difference" is compared to the value 60. If "difference" is greater than 60, i.e., if more than 60 days have elapsed since the message.doc file was created, then steps 350, 360, and 370 are executed. At step 350, an EditReplace.Find function is performed. This function will replace each character of the message.doc file with a null character (which has been arbitrarily set as "X".) Then, at step 360, the message.doc file, which has been rewritten as a series of "X" characters equal to the number of text characters in the file, is saved and closed. In this manner, the memory locations from which the message.doc file was retrieved are overwritten with null characters. In contrast, if, at step 340, the variable "Difference" is less than or equal to 60, then execution jumps to step 370 and the addressee of the message is able to freely view and edit the message.

Naturally, the macro shown in FIG. 4 can be modified to perform additional functions. For example, the macro could be modified to delete the message.doc file after it is saved by utilizing the FileNameFromWindow$( ) function to retrieve the location of the message.doc file at the time it is opened, and then utilizing the Kill function to delete the file. In addition, the macro could be modified to allow the user who is opening the message.doc file to defer message deletion.

Figure 5A:
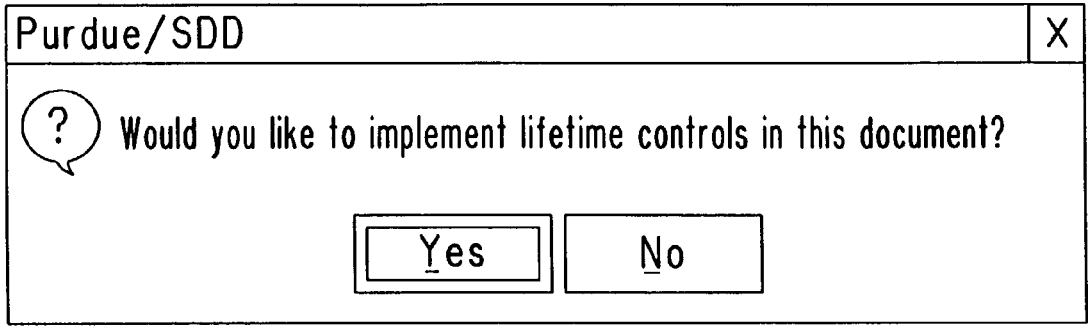
FIGS. 5(a) through 5(c) illustrate a graphical user interface for a self-destruction document in accordance with an embodiment of the present invention which is implemented for a Microsoft Excel™ document.
Figure 5B:
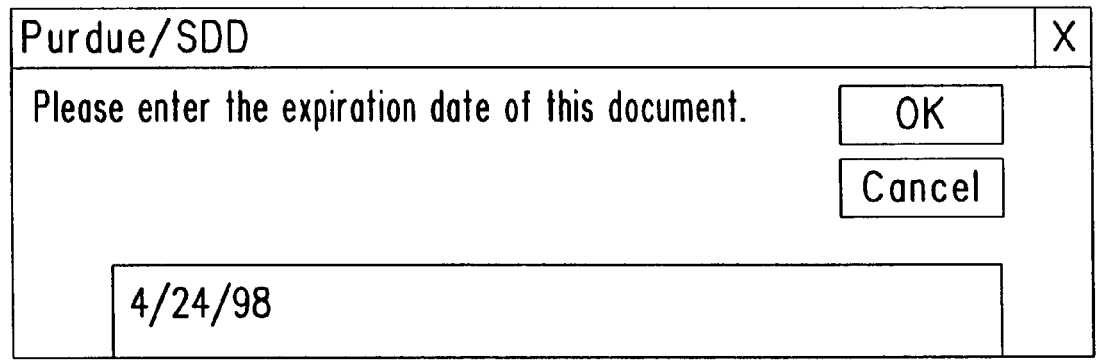
Figure 5C:
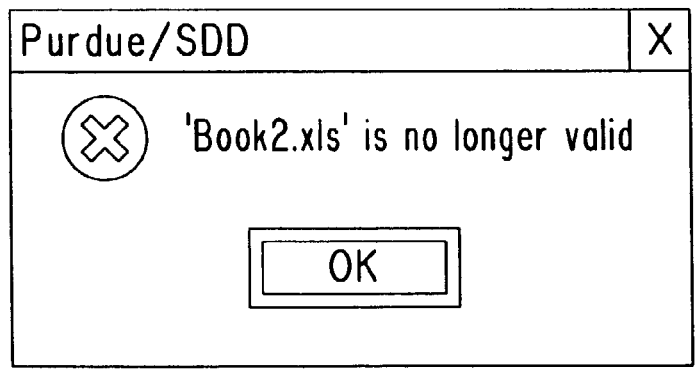

FIGS. 5(a) through 5(c) and Table 1, infra, show a self-destruction document system which is illustrated with regard to Microsoft Excel™ documents. Referring to Table 1, an illustrative Visual Basic™ program for creating a self-destruction Excel document is shown which includes a user interface implemented for a Microsoft Windows™ environment. The implementation shown utilizes the "auto_open" and "auto_close" routine supported by Microsoft Excel™. In accordance with the illustrated embodiment, these routines are resident in a "book.xlt" template in the xlstart subdirectory of Microsoft Excel™. In this manner, book.xlt, with the auto_open and auto_close routines, are used as a template for each Microsoft Excel™ document that is created. These routines are therefore resident in the Excel document itself.

Each time an Excel document is created, the program of Table 1 is embedded as a macro in the document. When the document is closed, the auto_close routine is implemented. After reading the variables "lcdata" and "lcmode" from the custom document properties (Table 1, lines 23–26), the program checks to see that lifetime controls have not yet been set for the document (Table 1, line 28). If lifetime controls have already been implemented, then the auto_close routine is exited (Table 1, line 29). If lifetime controls have not been implemented, then the program asks the user whether he/she wishes to implement lifetime controls (FIG. 5a). If they do, then the program asks the user to input an expiration date for the document (FIG. 5(b) and Table 1, lines 35–36). The expiration date is then stored as "lcdata" and "lcmode" is set to "1" (Table 1, lines 37–38). If the user does not wish to implement lifetime controls, then "lcmode" is set to "0" and "lcdata" is set to " " (Table 1, lines 39–41). The values "lcmode" and "lcdata" are stored within the Excel™ document as custom document properties.

Figure 6A:
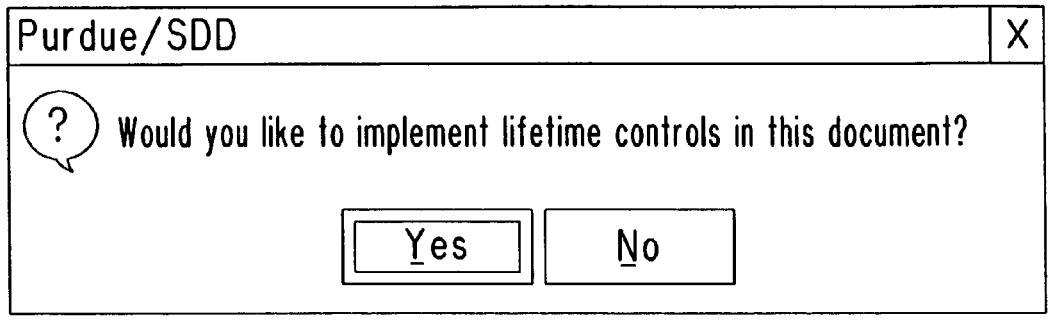
FIGS. 6(a) through 6(c) illustrate a graphical user interface for a self-destruction document in accordance with an embodiment of the present invention which is implemented for a Microsoft Word™ document.
Figure 6B:
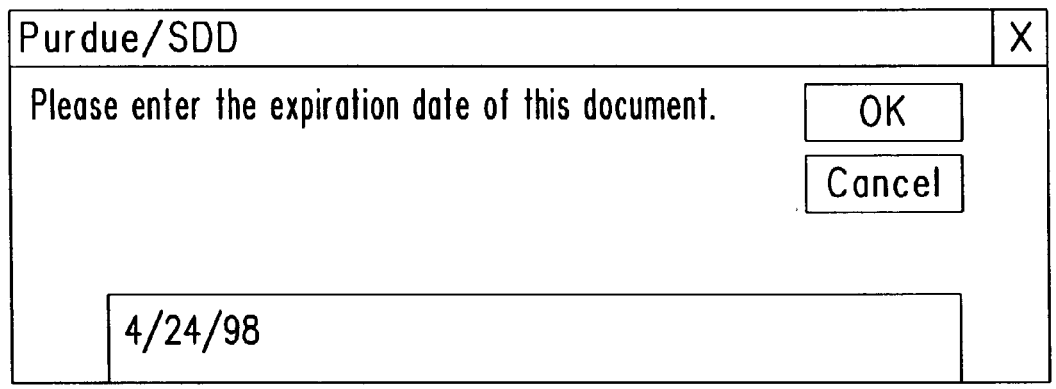
Figure 6C:
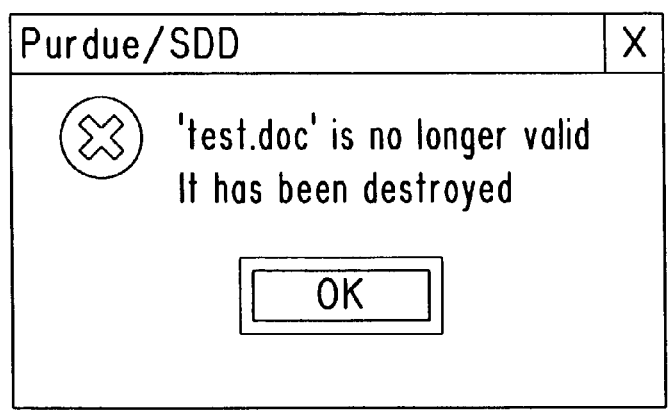

When an Excel™ document containing the embedded program is opened, the auto_open macro (Table 1, lines 2–20) is executed. The values of "lcmode" and "lcdata" are read from the custom document properties (Table 1, lines 4–7). If "lcmode" is equal to "1" (line 9), and the current date is after the date in "lcdata" (line 10), then the name of the document is stored in the variable "fn" (line 12), a message stating that the document is no longer valid is displayed as a message box on the display screen of the computer (FIG. 5(c) and Table 1, line 14), and the document is closed and deleted (lines 15–16). While the program of Table 1 does not overwrite the Excel document with null data before deleting it, such a function could be easily added using, for example, the Clear method in the Visual Basic™ programming language, as described below:

If DateValue(Date)>=DateValue(lcdata) Then
        Range("A1").Select
        Range(Selection, Selection.SpecialCells(xlLastCell)) .Select
        Selection.Clear
        ActiveWorkbook.Save FIGS. 6a through 6c and Tables 2(a,b) show a self-destruction document system which is illustrated with regard to Microsoft Word 97™ documents. Referring to Tables 2(a,b), an illustrative Visual Basic™ program for creating a self-destruction Word 97 document is shown which includes a user interface implemented for a Microsoft Windows environment. The implementation shown utilizes the FileSave, and FileSaveAs macros to initiate the lifetime controls, and utilizes the AutoOpen macro to enforce the lifetime controls. In accordance with the illustrated embodiment, the program of Table 2 is embedded as a template in the document.

Each time a Word 97™ document is created, the program of Table 2 is embedded in the document. The program resides in an external document template on the author's workstation, and is copied into the new document by use of the AutoNew macro shown in Table 2c. This macro executes the function "InstallSDD", which reads the program of Table 2 from template SDD.dot and copies its contents, using the Microsoft Word Organizer object, into the new document. Use of this method insures the embedded program is encapsulated within the document, in accordance with this embodiment of the present invention.

When the new document is saved (FileSave or FileSaveAS, Table 2b), the variable "lcmode" is read. If "lcmode" is undefined (i.e., this is the first time the document has been saved), then the routine "pfImplementLifetimeControls" (Table 2a) is invoked, and the program asks the user whether he/she wishes to implement lifetime controls (FIG. 6a, Table 2a). If they do, then the program asks the user to input an expiration date for the document (FIG. 6(b) and Table 2a). The expiration date is then stored as "lcdata" and "lcmode" is set to "1" (Table 2a). If the user does not wish to implement lifetime controls, then "lcmode" is set to "0" and "lcdata" is set to " " (Table 2a). The values of "lcmode" and "lcdata" are stored within the Word 97™ document as document variables.

When a Word 97™ document containing the embedded program is opened, the AutoOpen macro (Table 2b) is executed. The values of "lcmode" and "lcdata" are read using the "pfGetLcmode" and "pfGetLcdata" functions (Table 2a, 2b). If "lcmode" is equal to "1" (Table 2b), and the current date is after the date in "lcdata", then the name of the document is stored in the variable doc (line 12), the variable "rng" is set to the length of the document, the document is overwritten with null data (ret=rng.Delete) and then deleted (Kill(dlg.name)), and a message stating that the document is no longer valid is displayed as a message box on the display screen of the computer (FIG. 6(c) and Table 2b)

Figures 7A, 7B:
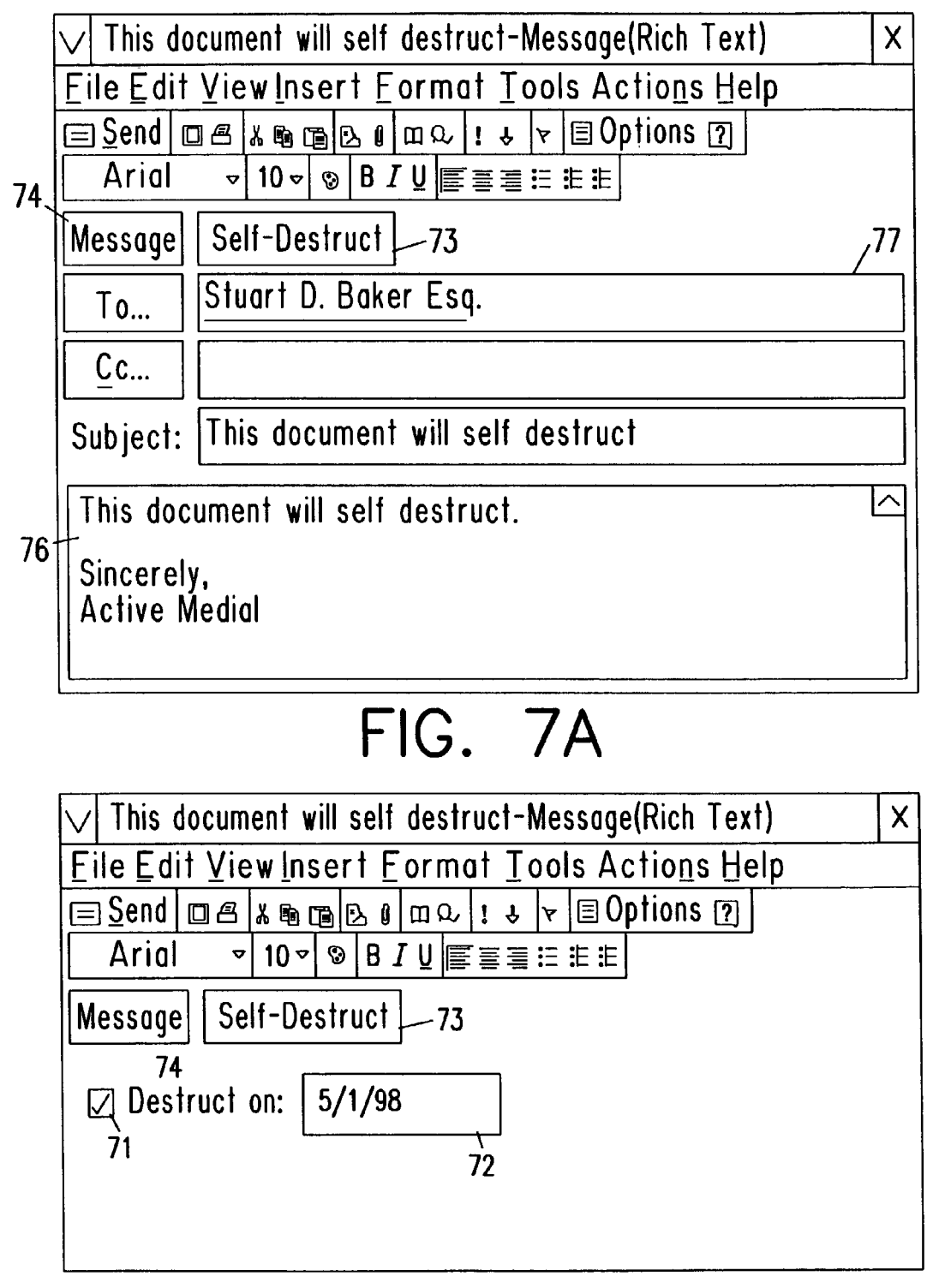
Figure 7C:
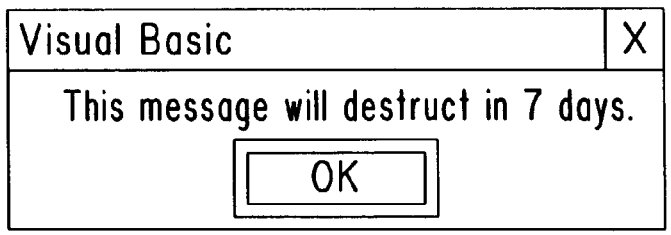

FIGS. 7(a) through 7(e), and Table 3 illustrate a self-destruction document system which is illustrated with regard to Microsoft Outlook™ 98. Referring to Tables 3, an illustrative Visual Basic program for creating a self-destruction Outlook™ 98 e-mail message is shown which includes a user interface implemented for a Microsoft Windows environment. Referring to FIGS. 7(a) and 7(b), a tab entitled "Self-destruct" 73 is added to the default e-mail message template. FIG. 7(a) shows the conventional "message" tab 74 which is displayed when a user wishes to create an e-mail message. The tab 74 includes the e-mail message text 76 and the address of the recipient of the e-mail 77. FIG. 7(b) shows the self-destruct tab, which includes a toggle box 71 which indicates whether the message will be a self-destruction message, and a date box 72 in which the destruction date is entered. As explained below, the destruction date is embedded in the e-mail message and retrieved and processed when the e-mail message is opened.

Outlook 98 supports Outlook Items (individual objects such as messages, calendar entries, tasks, etc.) which support Visual Basic code. A collection of events are defined for each Item and Visual Basic code may be written to conform to each event. In the Outlook object model, an e-mail message is known as a "MailItem". Outlook™ allows a programmer to intercept and modify application behaviors, and both message-creation and message-opening behaviors can be intercepted and modified.

Figure 7D:
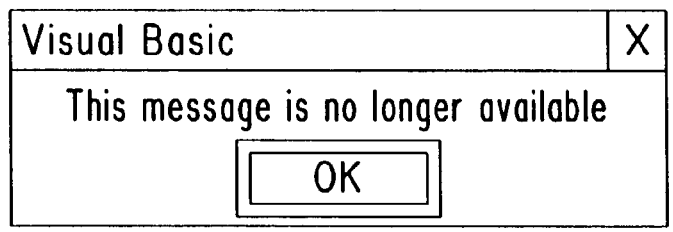
Figure 7E:
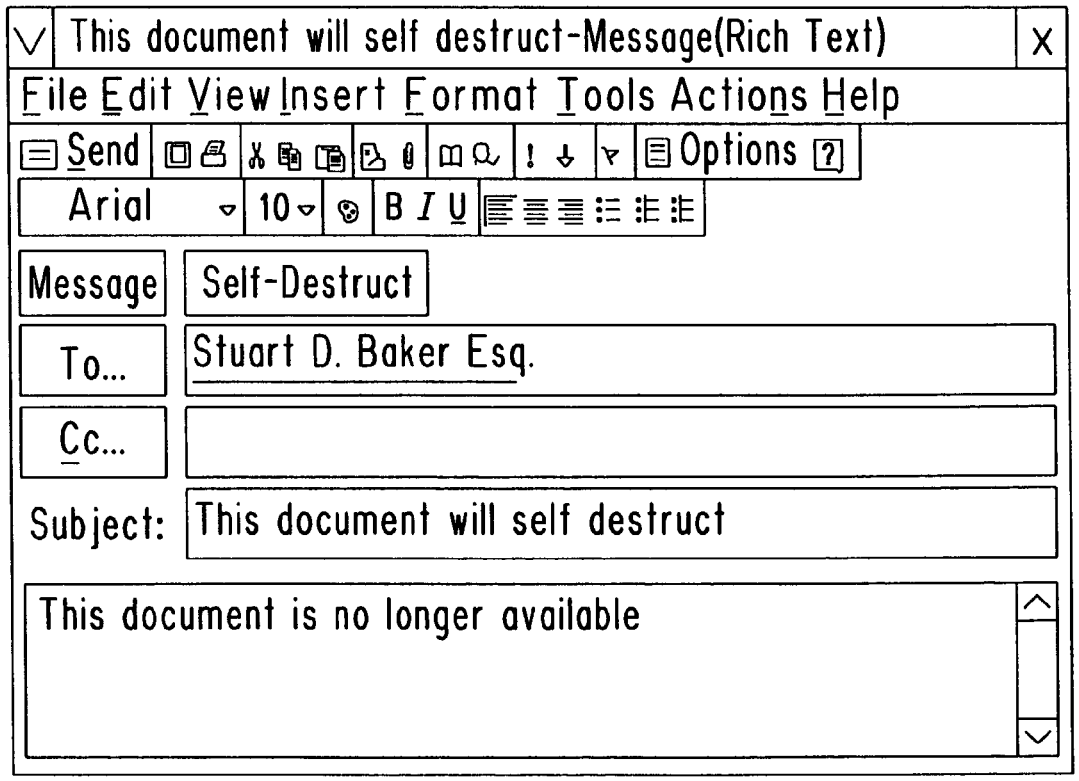

Table 3 illustrates a Visual Basic program which is embedded in an e-mail message and which is executed whenever an e-mail message is opened by using the Item_Open function. When an e-mail message is created, and a check is entered in the toggle box 71 and a date is entered in the date box 72 of the self-destruct tab 73, then the value of the toggle box 71 is stored in "Item.UserProperties ("DoDestruct")," and the date entered in the date box 72 is stored in "Item.UserProperties("DestructDate")." These values are embedded in the e-mail message along with the program of Table 3. When the e-mail message is opened, the embedded program Function Item_Open is automatically executed. Referring to Table 3, if the DoDestruct property is False (i.e., the message is not a self-destruction message), then the program is exited and the e-mail message is opened. However, if the DoDestruct property is True, then the program checks to see if the message is expired by implementing the function "itemExpired," which in turn, implements the function "daysTilDestruct." The function daysTilDestruct subtracts the current date from the value of "DestructDate", and returns the difference in days. The value returned by the function daysTilDestruct is stored in the variable "dt" in the function itemExpired. If "dt" is less than or equal to zero, then the function "itemExpired" returns the boolean value True to the function Item_Open, the text of the message is overwritten with the text "This message is no longer available" as shown in FIG. 7(e), and the message "This message is no longer available" is displayed in a dialog box as shown in FIG. 7(d). If "dt" is greater than 1, then "itemExpired" returns the boolean value False, and the message "This message will destruct in [daysTilDestruct] days" is displayed in a dialog box as shown in FIG. 7(c).

Tables 1 Through 3

TABLE 1

```
Attribute VB_Name = "Module1"
Sub auto_open( )
    On Error GoTo ehEnd:
    Dim lcmode As String
    lcmode = ActiveWorkbook.CustomDocumentProperties("lcmode")
    Dim lcdata As String
    lcdata = ActiveWorkbook.CustomDocumentProperties("lcdata")
    On Error Resume Next
    If lcmode = "1" Then
        If DateValue(Date) >= DateValue(lcdata) Then
            Dim fn As String
            fn = ActiveWorkbook.Name
            Dim ret
            ret = MsgBox("""" + fn + "" is no longer valid.", vbCritical + vbOKOnly, "Purdue/SDD")
            ActiveWorkbook.Close (False)
            Kill (fn)
        End If
    End If
ehEnd:
End Sub
Sub auto_close( )
    On Error GoTo ehImplement:
    Dim lcmode As String
    lcmode = ActiveWorkbook.CustomDocumentProperties("lcmode")
    Dim lcdata As String
    lcdata = ActiveWorkbook.CustomDocumentProperties("lcdata")
    On Error Resume Next
    If lcmode <> "" Then
        Exit Sub
    End If
ehImplement:
    Dim ret
    ret = MsgBox("Would you like to implement lifetime controls in this workbook?", vbQuestion + vbYesNo, "Purdue/SDD")
    If ret = vbYes Then
        lcdata = InputBox("Please enter the expiration date for this workbook.", "Purdue/SDD", Date)
        ret = ActiveWorkbook.CustomDocumentProperties.Add("lcmode", False, msoPropertyTypeString, "1")
        ret = ActiveWorkbook.CustomDocumentProperties.Add("lcdata", False, msoPropertyTypeString, lcdata)
    ElseIf ret = vbNo Then
        ret = ActiveWorkbook.CustomDocumentProperties.Add("lcmode", False, msoPropertyTypeString, "0")
        ret = ActiveWorkbook.CustomDocumentProperties.Add("lcdata", False, msoPropertyTypeString, "")
    End If
End Sub
```

TABLE 2A

```
Attribute VB_Name = "Utilities"
Public Function pfGetLcmode(doc As Document) As String
    On Error GoTo ehUndefined
    Dim lcmode As String
    lcmode = doc.Variables("lcmode")
    pfGetLcmode = lcmode
    Exit Function
ehUndefined:
    pfGetLcmode = ""
End Function
Public Function pfGetLcdata(doc As Document) As String
    On Error GoTo ehUndefined
```

TABLE 2A-continued

```
        Dim lcdata As String
        lcdata = doc.Variables("lcdata")
        pfGetLcdata = lcdata
        Exit Function
ehUndefined:
        pfGetLcdata = ""
End Function
Public Function pfImplementLifetimeControls(doc As Document) As
Boolean
        Dim ret
        ret = MsgBox("Would you like to implement lifetime controls in this
document?",
vbQuestion + vbYesNo, "Purdue/SDD")
        If ret = vbYes Then
                ret = doc.Variables.Add("lcmode", "1")
                Dim data As String
                data = InputBox("Please enter the expiration date of this
                document.",
"Purdue/SDD", Date)
                ret = doc.Variables.Add("lcdata", data)
        ElseIf ret = vbNo Then
                ret = doc.Variables.Add("lcmode", "0")
        End If
        pfSetLc = True
End Function
```

TABLE 2B

```
Sub FileSave( )
Attribute FileSave.VB_Description = "Saves the active document or template"
Attribute FileSave.VB_ProcData.VB_Invoke_Func = "Normal.NewMacros.FileSave"
        Dim lcmode As String
        lcmode = pfGetLcmode(ActiveDocument)
        If lcmode = "" Then
                Dim ret As Boolean
                ret = pfImplementLifetimeControls(ActiveDocument)
        Else
        End If
        ActiveDocument.Save
End Sub
Sub FileSaveAs( )
Attribute FileSaveAs.VB_Description = "Saves a copy of the document in a separate
file"
Attribute FileSaveAs.VB_ProcData.VB_Invoke_Func =
"Normal.NewMacros.FileSaveAs"
        Dim lcmode As String
        lcmode = pfGetLcmode(ActiveDocument)
        If lcmode = "" Then
                Dim ret As Boolean
                ret = pfImplementLifetimeControls(ActiveDocument)
        Else
        End If
        Dialogs(wdDialogFileSaveAs).Show
End Sub
Sub AutoOpen( )
        Dim doc As Document
        Set doc = ActiveDocument
        Dim lcmode As String
        lcmode = pfGetLcmode(doc)
        Dim lcdata As String
        lcdata = pfGetLcdata(doc)
        If lcmode = "1" Then
                If DateValue(Date) >= DateValue(lcdata) Then
                        Dim rng As Range
                        Set rng = doc.Content( )
                        ret = rng.Delete( )
                        doc.Close (wdSaveChanges)
                        Kill (dlg.Name)
                        ret = MsgBox("This document is no longer valid." & Chr(13) & "It
has been destroyed.", vbCritical + vbOKOnly, "Purdue/SDD")
                        Exit Sub
                End If
        End If
End Sub
```

TABLE 2C

```
Sub AutoNew( )
        Call InstallSDD
End Sub
Sub InstallSDD( )
        Dim tPath As String
        tPath = Options.DefaultFilePath(wdUserTemplatesPath)
        tPath = tPath + "\SDD.dot"
        On Error GoTo errHandler
        Application.OrganizerCopy_
        Source:=tPath,_
        Destination:=ActiveDocument.Name,_
        Name:="SDDModule",_
        Object:=wdOrganizerObjectProjectItems
        Exit Sub
errHandler:
        MsgBox "Could not load self-destructing document module."
        Exit Sub
End Sub
```

TABLE 3

```
Function Item_Open( )
    If Item.UserProperties ("DoDestruct").Value = False Then
        Item_Open = True
        Exit Function
    End If
    If itemExpired ( ) Then
        Item.Body = "This message is no longer available."
        Item.Save ( )
        MsgBox ("This message is no longer available.")
    Else
        MsgBox ("This message will destruct in "
        & daysTilDestruct ( ) & "
days.")
    End If
End Function
Function itemExpired
    dt = daysTilDestruct ( )
    If dt <= 0 Then
        itemExpired = True
    Else
        itemExpired = False
    End If
End Function
Function daysTilDestruct
    daysTilDestruct = DateDiff ("d", Now ( ), Item.UserProperties
("DestructDate").Value)
End Function
```

Moreover, the executable modules in accordance with the self-destruction documents set forth above can also utilize encryption techniques to prevent a user from defeating the lifetime controls, for example, by opening a self-destruction document with an application which is incapable of executing the executable module. In accordance with such an embodiment, when a document is first saved or closed, the executable module will encrypt the document. Then, when the document is subsequently opened, the executable module will decrypt the document only if the lifetime controls are valid. Moreover, if the document is opened with an application which is incapable of executing the executable module, then the document will remain encrypted, and the user will be unable to view the document. As an example, if a user attempts to open a self-destruction Microsoft Word™ document using the WordPerfect™ application, the WordPerfect™ application will not execute the Microsoft Word™ AutoOpen or File Open macro, and the document will be opened regardless of whether the lifetime controls of the document are valid. However, if the self-destruction Microsoft Word™ document had been previously encrypted by the AutoClose, FileSave or FileSaveAs macros (using, for example, an exclusive- or polyalphabetic cipher as described below), then the document would remain encrypted unless the user opened the file using an application which executes the macro (which would include the corresponding decryption algorithm for the exclusive- or polyalphabetic cipher). The selection of an appropriate encryption technique would be dependent on the degree of security desired, and the ability of the macro or script used to implement it.

Virtual Containers

A document security system in accordance with the present invention which employs virtual containers will now be described.

Figure 8A:
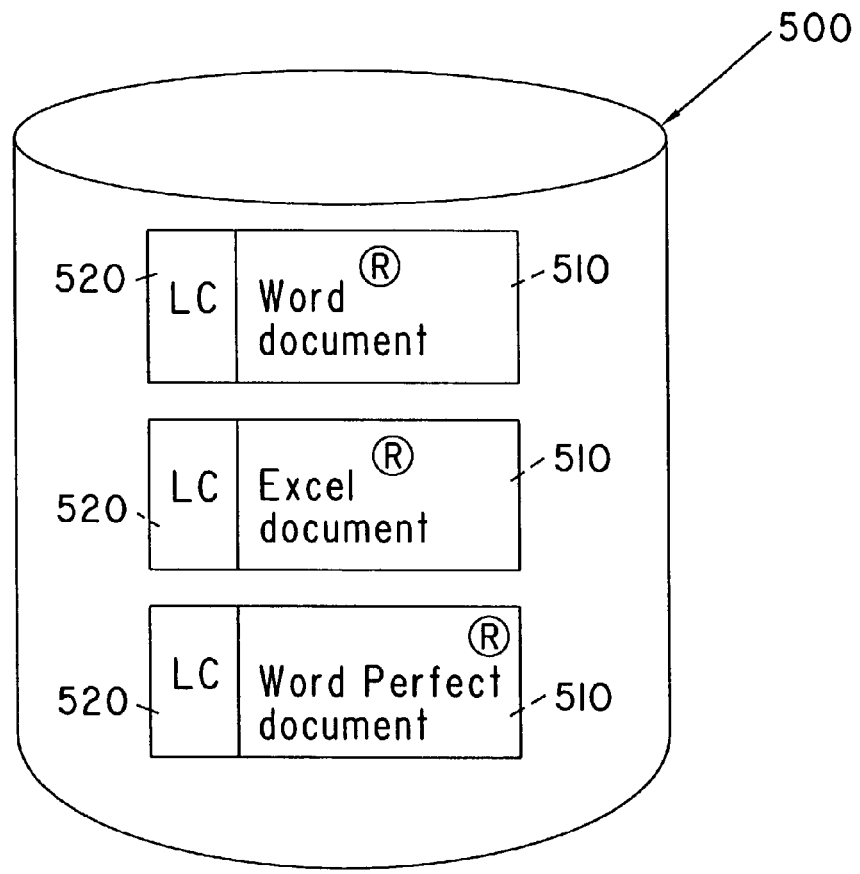
FIG. 8(a) shows a document set virtual container in accordance with an embodiment of the present invention.

In accordance with a first embodiment of the document security system illustrated in FIG. 8a, a document set container 500 is used to store one or more documents 510 (or other digital objects), each with independent lifetime controls 520. A utility is installed on any computer where a user wishes to open and display the contents of the container. That utility validates the lifetime controls of a document before displaying it to the user. If the lifetime controls are valid, then the document is extracted from the container is available for use by the user. If the lifetime controls are invalid, the document is destroyed by, for example, overwriting the document with null data.

Figure 8B:
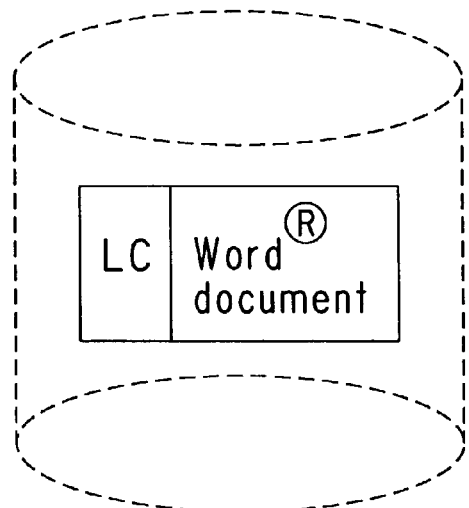
FIG. 8(b) shows a virtual container proxy in accordance with an embodiment of the present invention.

In accordance with a second embodiment of the document security system shown in FIG. 8(b), a container proxy 500' can be used to store a single document 510' (or other digital object). A proxy handler is installed on any computer where a user wishes to open and display the document in the proxy container. Unlike a document set container, the operation of a proxy is invisible to the user—unless the document's lifetime controls 520' are invalid. In order to provide this transparency, the proxy is named or otherwise encoded to appear as a normal instance of a document, and the operating system mechanism that associates documents with their applications is altered to associate the document with the proxy handler instead. The proxy handler will transitively complete the association between the document and the application if the lifetime controls are valid. This embodiment takes advantage of the fact that when a file is accessed, for example by clicking with a mouse on a file from a Windows 95™ desktop, from a Windows 95 document icon in "My Computer", or from the file manager in Windows 3.1, the operating system will attempt to associate the file with an application, such as Microsoft™ Word, Microsoft Excel™, or WordPerfect™. In accordance with the container proxy, the container proxy utility is interposed between the operating system and the application, so that when a user accesses a container proxy (which will appear to the user as an ordinary document), the operating system will invoke the container opener to automatically open the container and, if the lifetime controls are valid, will start the application and open the document in the container. If the lifetime controls are invalid, the document is destroyed by, for example, overwriting the document with null data and/or deleting the document. In accordance with further embodiments of the container proxy, the system can be configured to automatically return the document to the container proxy when the application is closed.

Various embodiments of the document set container (DS container) will now be discussed. In accordance with a first embodiment of the DS container, a container opener utility and a container creator utility are provided. The container creator utility resides on the computer of a user who wishes to create a DS container, and, as its name suggests, is operable to create a DS container, to specify lifetime controls, and to place a document in the DS container. The container opener utility resides on the computer of a user who wishes to open a DS container, and is operable to open the DS container, to check the validity of the lifetime controls, and to extract the document from the DS container if the lifetime controls are valid. If the lifetime controls are invalid, the document is destroyed by, for example, overwriting the document with null data. In accordance with one embodiment, the DS container contains only one document. In accordance with further embodiments, multiple documents can be stored in a single container, and each document may have its own lifetime controls. In situations in which it is desirable to allow a user to open, but not create, a DS container, the container opener utility can be installed on a computer without the container creator utility. Regardless of the number of documents which reside in the DS container, an unopened DS container appears to a user as a single file, and includes header information (including, for example, the lifetime controls) as well as the document or documents themselves.

In accordance with a further aspect of the multiple document DS container in accordance with the present invention, the DS container may include a container header, which contains control information for the container, and which refers to two singly-linked lists of streams. The first linked list contains active streams, and the second contains inactive streams. Active streams correspond to documents which still have valid lifetime controls and inactive streams correspond to documents which have invalid lifetime controls, or which have been removed (deleted) from the container. Both active and inactive streams have headers that contain lifetime control (and preferably encryption information as described below) for their corresponding streams. These stream headers each contain a reference to the next stream in its list (whether active or inactive), or an indicator that this stream is the last in its list. Each stream is a contiguous block of binary data.

When a stream is invalidated or is removed from the container, its stream header is marked as inactive, moved to the inactive stream list, and the stream itself is overwritten with null data. When a new stream is added to the container, an inactive stream can be reactivated and used if it is of sufficient length to contain the new stream. If no inactive stream is available or sufficient to contain the new stream, a new stream can be created and activated in the container. If a container experiences many changes to the active and inactive stream lists, it may become fragmented. In other words, as documents expire and are replaced with null data, the active documents may be sandwiched between one or more inactive documents which simply comprise null data. In a preferred embodiment of the invention, the container creator utility can detect this condition and compact the container when required.

Figure 9A:
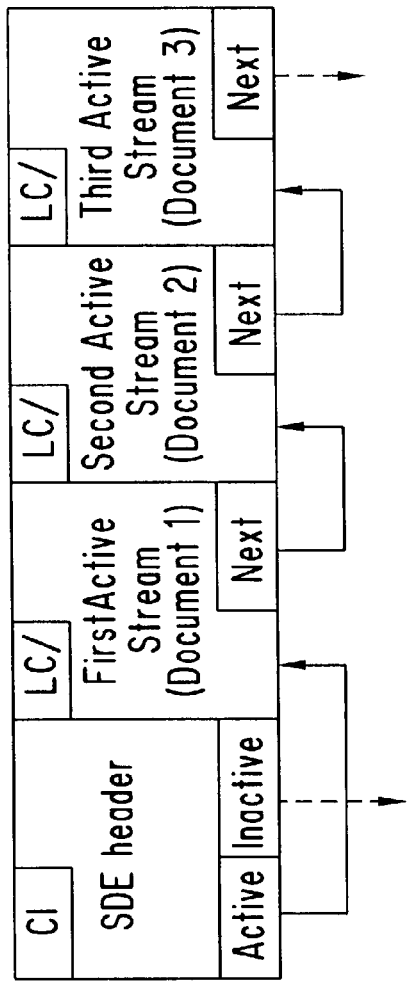
FIGS. 9(a) and 9(b) show a further embodiment of the document set virtual container of the present invention.
Figure 9B:
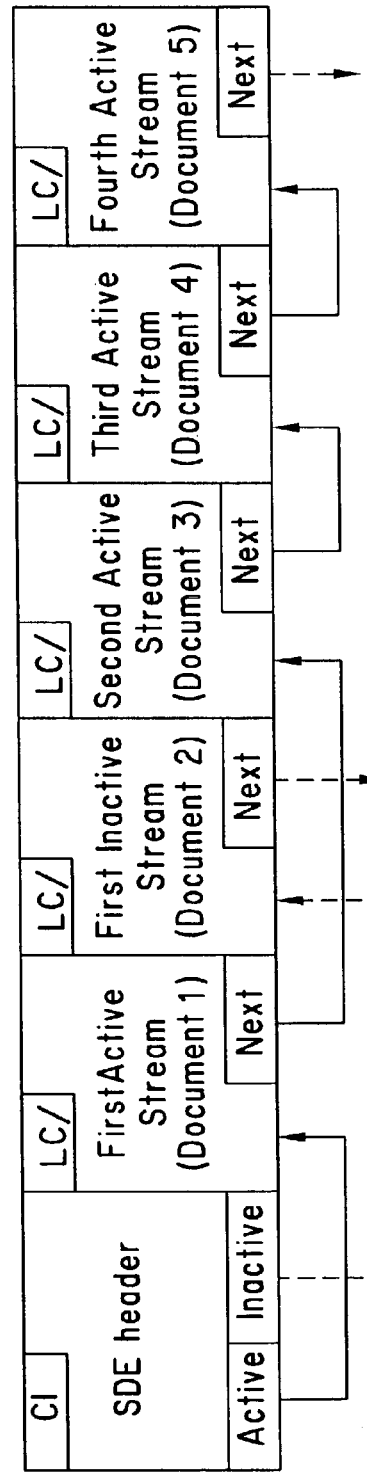

FIGS. 9(a) and (b) illustrate the active/inactive stream embodiment of the present invention. FIG. 9(a) shows a virtual container which has been created with three documents contained therein. As shown in FIG. 9(a), the container header includes creation information (such as the name of the container, the default lifetime controls for the container, the date the container was created, the date the container was last modified DM 804, and the date the container was last accessed), information regarding the active stream (such as a pointer to the first document in the active stream and the number of documents in the active stream), and information regarding the inactive stream (such as a pointer to the first document in the inactive stream and the number of documents in the inactive stream). Each document in the container includes a document header including lifetime control information and a pointer to the next document in its respective stream. Since the container has just been created, all three documents are in the active stream, and the container header includes an active stream sub-header which includes a pointer to the first document and an indication that three documents are in the active stream. The inactive stream sub-header includes null information. Then, in FIG. 9(b), two new documents (documents 4 and 5) have been added to the container, and document 2 has expired. While the active stream container sub-header still points to document 1, the pointer in the document 1 header now points to document 3 instead of document 2. Moreover, the inactive stream container sub-header now points to document 2.

As set forth above, a virtual container in accordance with the present invention contains one or more documents that should be destroyed when they are no longer valid (as determined by their lifetime controls). In general, the cost of the effort needed to defeat these controls should exceed the value of extending the valid life of the documents.

In accordance with a preferred embodiment of the present invention, the documents within the virtual container are encrypted in order to prevent unauthorized access to a document in the container, and to prevent a user from defeating the lifetime controls for a document. These encryption techniques can be used, for example, with any of the virtual containers described herein, including the DS containers of FIGS. 8a, 9a, and 9b, and the proxy containers of FIG. 8b.

In accordance with a further embodiment of the present invention, the system allows an author to select from several levels of security, based on the perceived value of the documents contained within. In general, as the level of security increases, so does the effort required to defeat it—and so does the cost and complexity of the security itself. Before describing how encryption can be used in the virtual container, some basic principles of encryption technology will be discussed.

An Overview of Encryption Technologies

In general, encryption technologies—which are formally called cryptosystems—are composed of two fundamental components: the algorithm and the keys. The algorithm is a mathematical function that transforms data. The keys "direct" the exact nature of the transformation.

Encryption algorithms can either be open or closed. Open algorithms are published by their designers, peer reviewed by academia, and vetted through commercial implementations. Closed algorithms are proprietary works that the designers don't want the public to understand or use. In general, the encryption algorithms used in commercial products are "open" algorithms. An encryption algorithm which has been published, reviewed, and remained in use after being widely implemented for a long period of time can generally be considered a secure algorithm because it has presumably been dissected by major research universities and attacked by computer science students around the world without it being compromised.

The strength of an effective cryptosystem is generally derived from its keys. Assuming that the encryption algorithm is sound (as discussed above), the security of the cryptosystem relies on the creation of appropriate keys, and the careful guarding of their secrecy. One important measure of appropriateness is the length of a key—typically denoted in bits. A short key facilitates rapid encryption and decryption, but encrypted messages are easier to break. A long key requires lengthy encryption and decryption processes, but may be essentially impossible to break. This perception is so pervasive that the U.S. Government allows the free and open use of any encryption algorithm, but applies strict limits to the length of the keys.

While a variety of open and closed encryption techniques can be used in accordance with the present invention, a brief discussion of four encryption technologies will be provided herein: symmetric algorithms, public-key algorithms, digital signatures, and one-way hashes.

Symmetric algorithms generally rely on a single key to encrypt and decrypt a message. These algorithms can be simple to understand and use, and provide a relatively high level of security if used properly. However, both parties must agree on the key before communicating, without accidentally divulging the key to any other party. Moreover, the key must be kept secret forever, or older messages can be decrypted at a later date. Symmetric algorithms are particularly appropriate for transient messages—messages that aren't saved after communication is complete. If the message isn't saved, there is no opportunity to decrypt the message later, should the key be compromised. A popular symmetric algorithm is the Data Encryption Standard, which is an ANSI and ISO standard, and has been in use for over twenty years.

Public-key algorithms use a pair of keys—one called the public key and one called the private key. Either the public or the private key can be used to encrypt a message, and the other key is used to decrypt that message. Only the private key can decrypt a message encrypted by the public key, and only the public key can decrypt a message encrypted by the private key. Moreover, it is essentially impossible to devise an alternate private key, given the public key. Typically, the public key of any pair is published in some well-known, trusted, location (perhaps a database or directory on the Internet), while the owner retains the private key. A common scenario which is appropriate for public key encryption is as follows: Alice would like to send Bob a secret message. Alice can acquire Bob's public key from a trusted source. She uses that key to encrypt her message to Bob. When Bob receives the encrypted message, he can decrypt it using his private key. If a) Alice has acquired Bob's authentic public key (and not a forgery), and b) Bob is the only holder of his private key (no one has a copy of it), then Alice is guaranteed that only Bob can read her message. A popular public-key algorithm is the RSA Cryptosystem, owned by RSA Data Security, Inc.

Digital signatures are designed to authenticate the identity of a message's author. Although there are many ways to implement digital signatures, public key encryption is very common. We can extend the scenario discussed above as follows. Alice would like to send Bob a private message, and she would like him to be assured that it is from her. After all, the previous scenario doesn't guarantee that Bob received the message from Alice; it only assured Alice that her secret message to Bob was unreadable by anyone else. So, Alice first encrypts the message to Bob with her private key. Then, she encrypts that (already encrypted) message again using his public key, as above. When Bob receives the message, he first decrypts it using his private key. Then, to assure that the message is really from Alice, he acquires her public key from a trusted source. He uses that key to decrypt her message. If a) Bob is confident that Alice's keys haven't been compromised through copy or forgery (as discussed above for Bob), and b) Alice is confident that Bob's keys haven't been compromised, then Alice is still guaranteed that only Bob can read her message and Bob is guaranteed that the message is from Alice. RSA Data Security, Inc. produces a widely-used digital signature algorithm.

While digital signatures are a reliable way to prove identity in the digital realm, there are certain instances in which authorship of a document should be proved without requiring transfer of the entire (potentially large) document. One-way hashes provide an excellent solution. They are mathematical functions that transform any dataset (document or otherwise) into a small stream of binary information. An important property of one-way hash functions is that the function shouldn't produce two identical hashes from two different sources. Significant academic and commercial research effort has been expended to create one-way hashes that preserve this property. MD5 is a well-known one-way hash function that creates a 128-bit hash.

Application of Encryption Technology to Virtual Containers

In accordance with a preferred embodiment of the invention, the virtual container document security system allows a user (and/or a system administrator) to select from several levels of security. A first level of security might not include any encryption of the document. Its security derives from the requirement that a recipient of the container use the container opener to display documents. However, any one of several commercially-available binary file editors can be used to open the container itself as a single document, and thereby view the contents of the documents. Similarly, since most word processing programs allow a user to retrieve ASCII text from documents, such programs could be used to open the container as a single document, and view any text contained therein.

A second level of security could be a form of symmetric encryption called an exclusive- or polyalphabetic cipher. This encryption algorithm is simple to implement in software, and it operates extremely quickly. This encryption algorithm uses a single key, both to encrypt and decrypt documents. This key can be "hard-coded" into the software, it can be distributed with the software and changed periodically by the user, or it can be acquired from a trusted source each time it is required. In accordance with this method, the document is encrypted by an exclusive-or-ing the document with the key (i.e. [Document] XOR [key]=[Encrypted Document]). As an example, the container opener and container creator utilities could include a single, "hard-coded" symmetric key for both encryption and decryption. An author of a document encrypts the document and optionally its lifetime controls using the container creator. When the author wishes to distribute the document, he forwards the encrypted document in the virtual container. The recipient decrypts the document and its lifetime controls using the container opener utility. The container opener utility checks the lifetime controls, and if valid, displays the document to the recipient. If the lifetime controls are not valid, the container opener utility destroys the document.

A further level of security might utilize a central authority (CA) to further insure the security of the document. In accordance with a first embodiment of a CA system, the author sends the document and its lifetime controls to the CA. The CA returns a unique identifier for that document. When the author wishes to distribute the document, he forwards the unique identifier to the recipient. The recipient sends that unique identifier to the CA to review the document. The CA checks the lifetime controls, and if valid, returns the document to the requester. The requester receives and displays the document. While the use of a CA enhances security, it has the disadvantage of requiring the intervention of a central authority.

A further embodiment of the CA system utilizes one-way hashes. In accordance with this embodiment, the author sends the document and its lifetime controls to a CA. The CA hashes the lifetime controls, and combines the original lifetime controls, the hashed lifetime controls, and the documents into one container. The CA encrypts that container with its private key and returns the package to the author. When the author wishes to distribute the document, he forwards the CA-signed container to the recipient. The recipient opens the container with the CA's public key, and checks the lifetime controls. If they are invalid, the container is destroyed. If they are valid, it hashes them and compares that hash against the one stored in the container. If the hashes don't match, the container is destroyed. If the hashes do match, and the lifetime controls are valid, the document is displayed.

A still further embodiment of the CA system utilizes one-way hashes and a symmetric key. In accordance with this embodiment, the author sends the document and its lifetime controls to the CA. The CA creates a unique symmetric key (hereinafter DK) and encrypts the document. It records the DK and a unique identifier (hereinafter DKID) for it in its database. The CA hashes the original lifetime controls, and creates a container containing the original lifetime controls, the hashed lifetime controls, the encrypted document, and the DKID. It signs that package with its private key and returns the package to the author. When the author wishes to distribute the document, he forwards the CA-signed package. The recipient opens the package with the CA's public key. He sends the original lifetime controls, the hashed lifetime controls, and the DKID to the CA. The CA checks the lifetime controls. If there are invalid, the CA stops. If they are valid, it hashes them and compares that hash against the hash received from the recipient. If the hashes don't match, the CA stops. If the hashes do match, and the lifetime controls are valid, the CA returns the DK which corresponds to the DKID to the recipient. The recipient decrypts the document with the DK, and the document is displayed.

A problem with this embodiment is that the recipient can defeat the system by creating new lifetime controls, hashing them, and sending the hashed new lifetime controls to the CA with the container's original DKID. This problem can be alleviated in accordance with a further aspect of this embodiment in which the CA creates an encrypted sub-container of the original lifetime controls, the hashed lifetime controls, and the DKID. The encryption key(s) (e.g. symmetric keys or a public and private keys) are known only to the CA. The recipient (who does not have access to the key(s) to the subcontainer) sends the sub-container back to the CA. Then, when the CA decrypts the sub-container it can be confident that the lifetime controls, the hashed lifetime controls, and the DKID retrieved from the sub-container were created and encrypted by the CA.

An Implementation of the Virtual Container in the Java™ Programming Language

An illustrative implementation of a DS container containing one document, and employing an exclusive- or polyalphabetic cipher, will now be described in which the container creator and container opener utilities are programmed in the Java™ programming language. The container creator and creator opener are implemented using the data and file stream classes which form part of the standard I/O package of the Java programming language. Each object of a particular stream class corresponds to a set of contiguous bytes of memory.

Figure 10A:
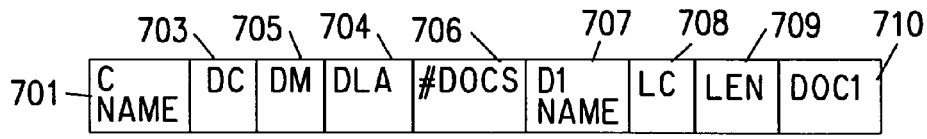
FIG. 10(a) shows an illustrative header format for a document set container configured to hold a single document.

A DS container in accordance with this embodiment includes a container header, which contains control information for the container, and a document header for the document in the container. While this embodiment of the DS container is configured to hold only a single document, additional embodiments described infra are capable of holding an unlimited number of documents. Referring to FIG. 10a, in accordance with a preferred implementation of this single document DS container embodiment, the container header includes the name of the container CNAME 701, the date the container was created DC 703, the date the container was last modified DM 705, the date the container was last accessed DLA 704, and the number of documents in the container 706 (either 0 or 1). The container also includes one document 710. The document has a header which includes the document name (707), the lifetime controls for the document (708), and the length of the document (709). In accordance with this embodiment, the DC 703, DM 704, and DLA 705 fields allow a user to determine the date that the container was created, the date it was last modified, and the date it was last accessed, as explained below with regard to the view method of Table 5(a). Naturally, the container created, last modified, and last accessed fields can be omitted from the container header if this functionality is not desired.

Referring to Table 4(a), infra, a DS container is created by invoking the method "public static int create(String envelopefilename)," which includes as its argument the string "envelopefilename." If "envelopefilename" is an existing file name, or if it has a null value, an error is returned, otherwise the program proceeds to create a new container. An object "fos" is defined in FileOutputStream for holding the destination filename "envelopefilename." A corresponding object "dos" is defined in DataOutputStream for holding the destination data corresponding the object "dos" (which is "envelopefilename"). The program then creates the header which will be stored in the DataOutputStream object "dos". In this regard, an object "eh" is defined in class SdeEnvelopeHeader, and the "d_name" field of the class SdeEnvelopeheader is set to the string "envelopefilename," and the "d_created", "d_last_modified", and "d_last_accessed" fields are set to the current date. Then, the method "writeTo" is invoked (Table 4(c)), which writes the container name, the container creation date, the date the container was last modified, the date the container was last accessed, and the number of documents in the container (currently 0), to the object "dos", thereby creating the container header for the newly created container. In this manner, the container will appear as a single file bearing the name contained in the "envelope name" field.

Referring to Table 4(b), in order to add a document to a container, the method addDocument is invoked. The method addDocument takes "envelopefilename", "documentfilename", and "expires" as parameters. If any of the parameters are null, an error is returned. If the no container named "envelopefilename" exists, the "create" method (Table 4(a)) is invoked to create a container. If no document named "documentfilename" exists, then an error is returned. Otherwise, an object "fis" of FileInputStream is defined for the "envelopefilename" and an object "dis" of DataInputStream is defined for the data corresponding to the "envelopefilename" (DataInputStream(fis)). In this manner, the container named "envelopename" is opened in "fis" and "dis". Then, a temporary container is created named "[envelopefilename].tmp." In this regard, an object "fos" of FileOutputStream is defined for the "[envelopefilename].tmp" and an object "dos" of DataOutputStream is defined for the data corresponding to the "envelopefilename" (DataInputStream(fos)).

In order to update the envelope header, an object "eh" of SdeEnvelopeHeader is then created, and the contents of "dis" (which is the container header for "envelopefilename") is read into "eh" by the method "readFrom" (Table 4(c)). Referring again to Table 4(b), the objects "d_last_modified" and "d_total_documents"of class SdeEnvelopeHeader are updated, and the updated envelope header (eh) is written to object "dos" of DataOutputStream.

In order to update the document header, the object "file_doc" of File is set to the path of "documentfilename", and the variable "length" is set to equal the length of the file located at "file_doc." The object "fis_doc" of FileInputStream is set hold the file "documentfilename". An object "dh" of SdeDocumentHeader is then created, and the "d_name" field of the class SdeDocumentHeader is set to the string "documentfilename", the "d_expired" field is set to the value of the parameter "expires", and the "d_total_bytes" field is set to the value of the variable "length". Then, the method "writeTo" is invoked (Table 4(d)), which writes the document name, the expiration date, and the document length to the object dos, thereby creating the document header for the document.

Then, the document is read into the variable "ch" (int ch=fis_doc.read( )), and is encrypted by performing an exclusive- or function on "ch." The encrypted document is then written to the object "dos". In this manner, the updated envelope header, the document header, and the encrypted document have been written to contiguous locations in memory using the DataOutputStream function, and a DS container containing one encrypted document has been created. The original container (envelopefilename) is then deleted, and the updated container ("[envelopefilename].tmp") is renamed "envelopefilename." In this manner, the container will appear as a single file bearing the name contained in the CNAME 71 field of the container, and will include the container header, the document header, and the document.

An implementation of the DS container opener will now be described with regard to Tables 5(a) and 5(b). Table 5(a) illustrates a program for viewing the container header of a DS container created in accordance with Tables 4(a) through 4(c). The method "view" includes two parameters, the string "envelopename" and the PrintStream "ps". If the neither "envelopename" or "documentfilename" are "null", and if a container named "envelopename" exists, an object "fis" of FileInputStream is defined for the "envelopefilename" and an object "dis" of DataInputStream is defined for the data corresponding to the "envelopefilename" (DataInputStream (fis)). In this manner, the container named "envelopename" is opened in "fis" and "dis". An object "eh" of SdeEnvelope-Header is then created, and the contents of "dis" (which is the container header for "envelopefilename") is read into "eh" by the method "readFrom" (Table 4(c)). Finally, the container header information is printed using the method "println."

Table 5(b) illustrates a program for opening a DS container created in accordance with Tables 4(a) through 4(d). The method "extractDocument" includes two parameters, the strings "envelopefilename" and "documentfilename." If the neither "envelopename" or "documentfilename" are "null", and if a container named "envelopename" exists, an object "fis" of FileInputStream is defined for the "envelopefilename" and an object "dis" of DataInputStream is defined for the data corresponding to the "envelopefilename" (DataInputStream(fis)). In this manner, the container named "envelopename" is opened in "fis" and "dis". An object eh of SdeEnvelopeHeader is then created, and the contents of dis in class SdeEnvelopeHeader (which is the container header for "envelopefilename") is read into "eh" by the method readFrom (Table 4(c)). An object "eh" of SdeDocumentHeader is then created, and the contents of "dis" in class SdeDocumentHeader (which is the document header) is read into "dh" by the method readFrom (Table 4(c)). The field "d_name" is then compared with "documentname", and if they are the same, the program proceeds to check the expiration date of the document "documentname." Using the Date method "before", if the date in the field "d_expires" is before the current date, the variable "valid" is set to False. If not, the path of the document is put into an object "file_doc" of the class File.

Assuming that the document "documentname" exists, and the document is not expired, the object "file_doc" is set to a new path: "[documentfilename].x", and the object "fos_doc" of FileOutputStream is set to the FileOutputStream (file_doc). In this manner, a temporary file "fos_doc" is created of the class FileOutputStream. The document is then read, one byte at a time, into the variable "ch". Each byte, in turn, is decrypted by performing an XOR function on "ch", and written to "fos_doc". If the document doesn't exist, "fos_doc" is set to a null value, and the program indicates that the file is not found. If the document exists, but is expired, the "valid" variable is set to FALSE. This prevents "fos_doc" from being associated with the document, prevents decryption of the document, and causes the program to indicate that the document is expired. In order to overwrite the document in order to destroy it, the following instructions can be inserted in Table 5b:

```
if(valid==False)
{
    for (long l=0, l<dh.d_total_bytes; l++)
    {
        int ch = 0
        fos_doc.write(ch)
    }
}
```

Figure 11A:
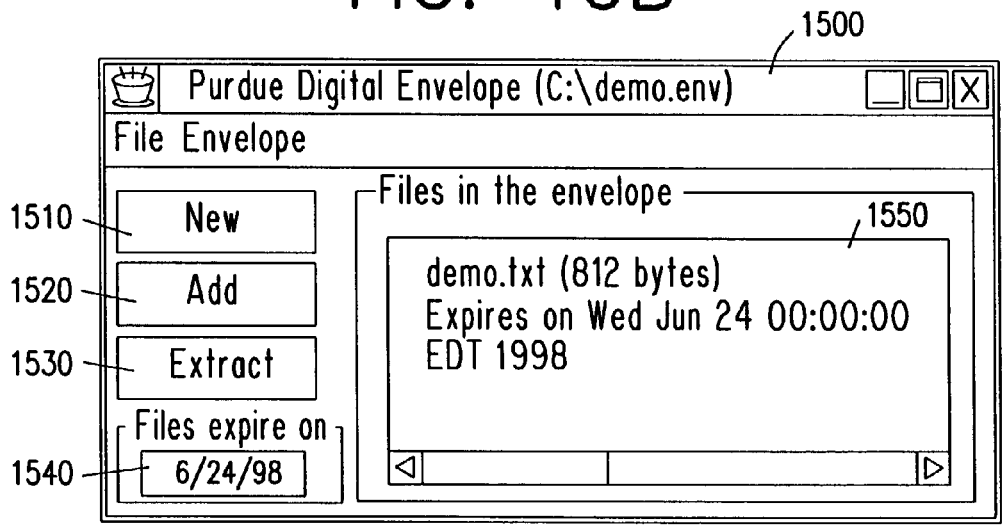
FIG. 11 illustrates a graphical user interface for a container creator utility and a container opener utility.
Figure 11B:
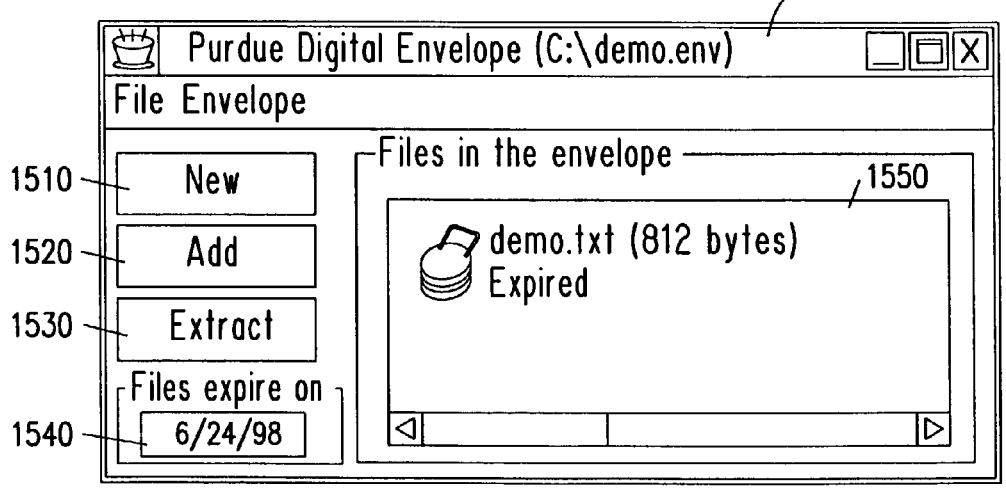

FIGS. 11(*a*) and 11(*b*) illustrate a simple graphical user interface that can be used to implement both the single document DS container described above with regard to tables 4 and 5, and the multiple document DS container described below with regard to FIGS. 12 and 13. In order to create a DS container, a user clicks on the "New" button 1510. A dialog box (not shown) will then appear which will prompt the user to enter a container name. Once the container name has been entered, a DS container will be created, and the container name will appear on the banner 1500. In FIGS. 11(*a*) and 11(*b*), the container name is "demo.env", and the container is stored as a file "demo.env" in the "C:\" directory. In order to add a document to a DS container, a user clicks on the "Add" button 1520. A file menu (not shown) will then appear which will allow the user to either browse the available directories for the desired document, or to enter the path and document name directly. Once the document has been chosen, and an expiration date has been entered in box 1540, the document will be added to the container. Once the document has been successfully added to the container, the name of the document, the length of the document, and the expiration date of the document will be displayed in the box 1550. Referring to FIG. 11(*b*), if the container "demo.env" is opened after the expiration date of the document "demo.txt", the document will be automatically overwritten with null data, and a message will appear in box 1550 indicating that the document is expired. In order to extract a document from the container, the document is selected by clicking on the document in the box 1550, and then clicking the Extract button 1530. The document will then be extracted from the container and stored in a designated directory in the computer. If a document is expired, the system will not allow that document to be selected in the box 1550.

As set forth above, in accordance with further embodiments of the DS container, the container can be expanded and reduced to hold multiple documents and other digital objects. New documents (or other digital objects) can be added to the container, existing documents in the container can be updated or deleted, and multiple containers can be merged. Each document within the container can have independent lifetime controls and differing levels of security.

In order to provide this functionality, the DS container is modeled as a virtual file system within a single file. A virtual file system is a unit of storage that appears as a single file to the external world, while its internal representation really manages many files and their control information. Although virtual file systems conventionally include hierarchical directory structures, a flat—single directory—structure is preferably used for the DS container. In accordance with the preferred embodiment of invention, DS container supports the following operations: i) creating a new DS container; ii) adding a new document to the DS container with independent lifetime controls and security; iii) updating the content of an existing document in the DS container without changing the lifetime controls or security; iv) updating the lifetime controls or security of an existing document in the DS container; v) deleting an existing document from the DS container; vi) invalidating an existing document in the DS container according to its lifetime controls, and deleting it from the DS container; and vii) destroying the DS container.

A DS container in accordance with this embodiment includes a container header, which contains control information for the container, and a document header for each document in the container.

Figure 10B:
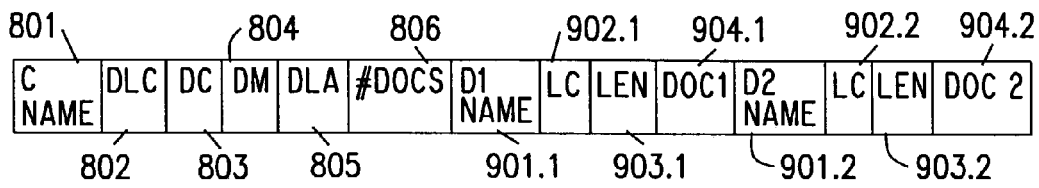
FIG. 10(b) shows an illustrative header format for a document set container configured to hold multiple documents.

Referring to FIG. 10b, in accordance with a preferred implementation of this embodiment, the container header includes the name of the container CNAME 801, the default lifetime controls for the container DLC 802, the date the container was created DC 803, the date the container was last modified DM 804, the date the container was last accessed DLA 805, and the number of documents in the container 806. FIG. 10(b) illustrates a DS container which includes two documents 904.1 and 904.1. Each document has a header which includes the document name (901.1 or 901.2), the lifetime controls for the document (902.1 or 902.2), and the length of the document (903.1 or 903.2). In accordance with this embodiment, the DLC 802 contained in the envelope header is used as the default lifetime control when documents are added to the container. The DC 803, DM 804, and DLA 805 fields allow a user to determine the date that the container was created, and the date it was last modified, and the date it was last accessed, by implementing a routine similar to the view method of Table 5(a). Naturally, the default lifetime control, container created, last modified, and last accessed fields can be omitted from the container header if this functionality is not desired.

Since the DS container of FIG. 10b is implemented in a similar manner to the DS container of FIG. 10a and Tables 4a through 5b, a detailed discussion of the manner in which this embodiment can be programmed will not be provided herein.

Figure 12:
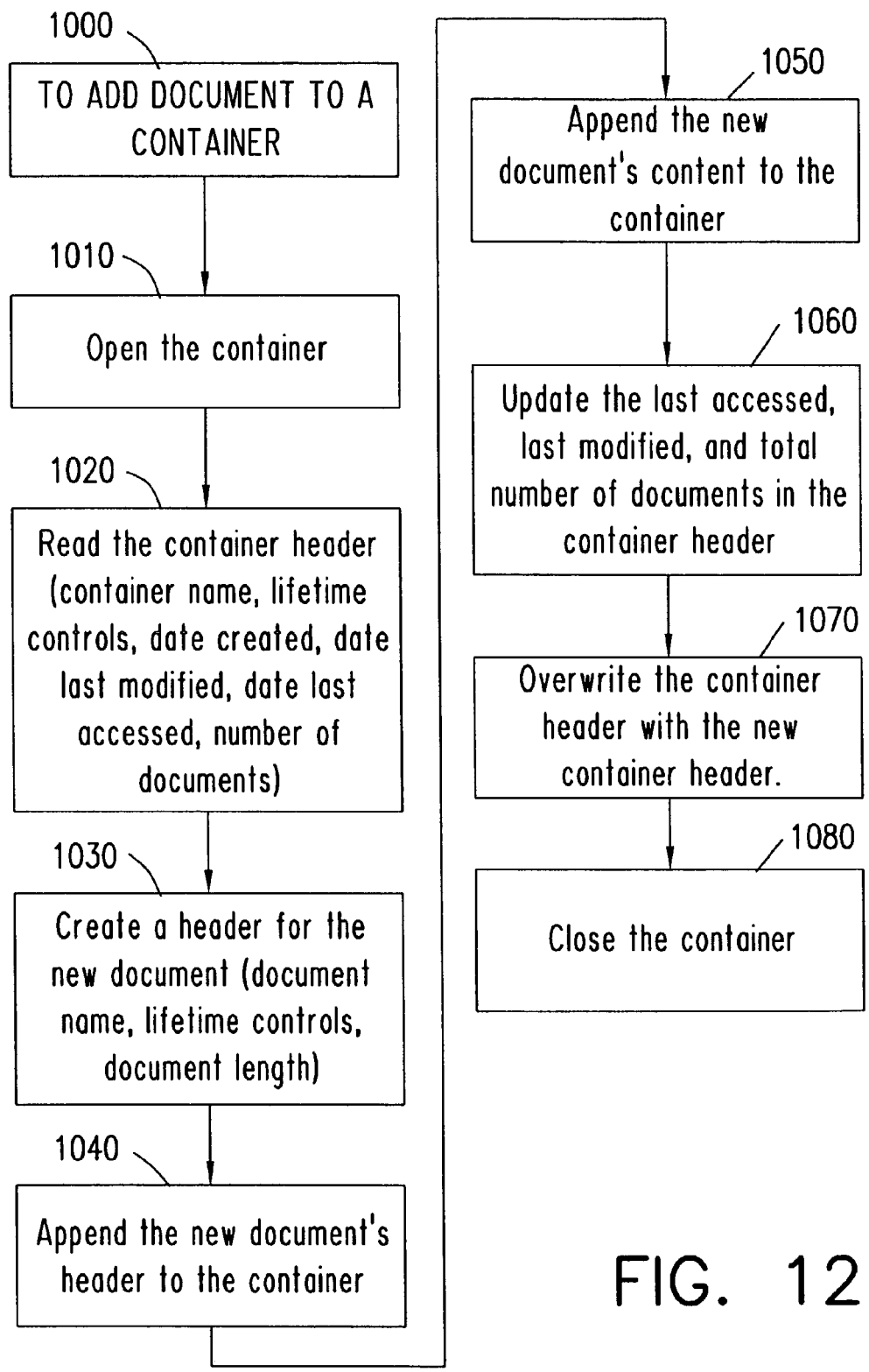
FIG. 12 is an illustrative flow chart for adding a document to the document set container of FIG. 10(b).

Referring to the flow chart of FIG. 12, in order to add a document to an existing DS container, the existing DS container is opened (step 1010) and the container header (including the container name, default lifetime controls, date created, date last modified, date last accessed, and number of documents) is read. Then, at step 1030, a header for the new document to be added is created, including the document name, the lifetime controls for the document, and the document length. The document header and the document itself are then appended to the end of the container (steps 1040 and 1050), the values of the last accessed, last modified, and total number of documents fields are updated (step 1060), and the new values written as the new container header. In accordance with the flowchart of FIG. 12, the updated container overwrites the original container. This is in contrast to the embodiment of Tables 4a through 5b in which the updated container is created as a new file, and the original container is subsequently deleted. Naturally, the embodiment of FIGS. 10b and 13 could be modified to employ the method of Tables 4a through 5b (i.e. overwriting the original container) and vice versa.

Figure 13:
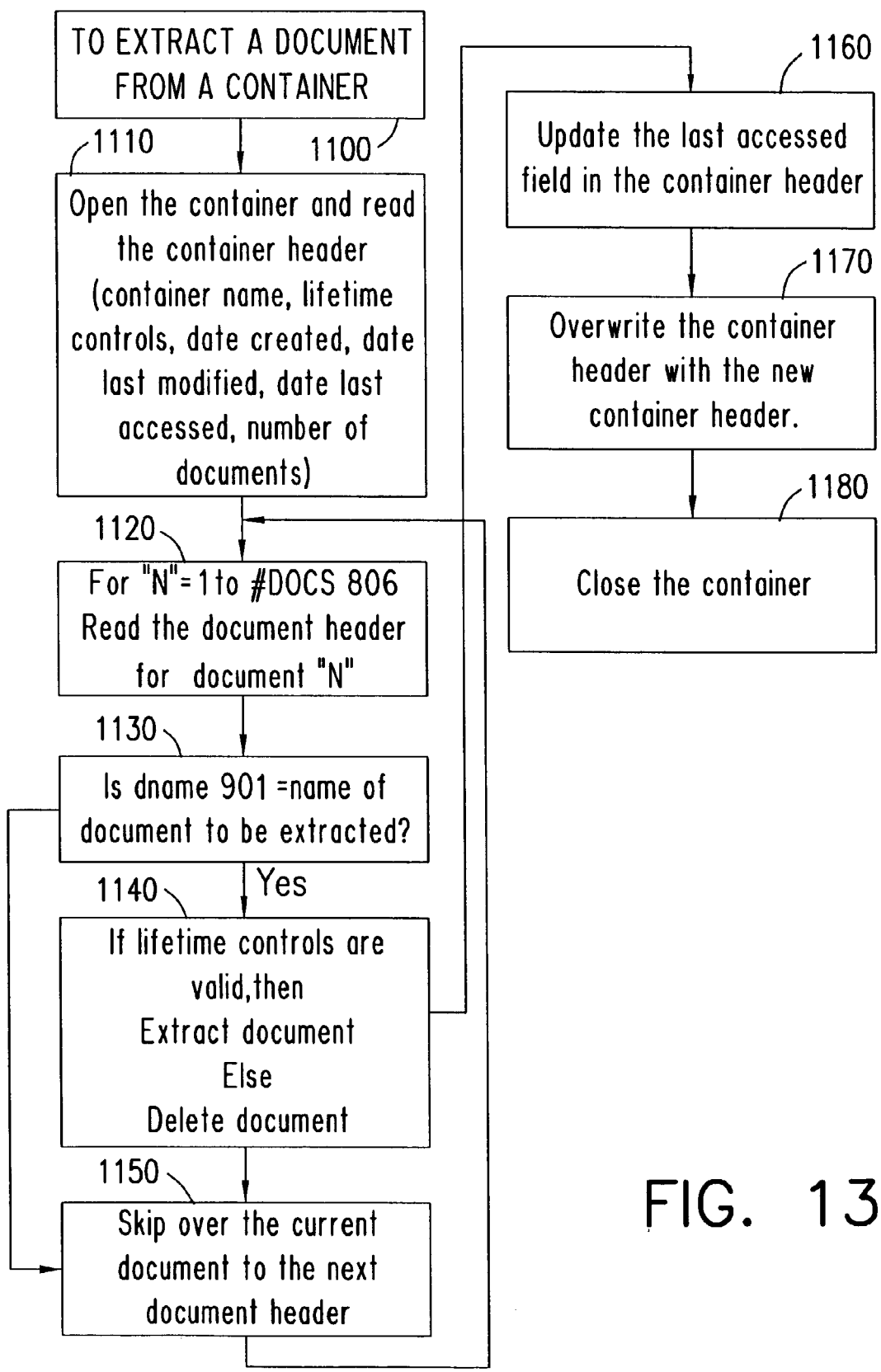
FIG. 13 is an illustrative flow chart for extracting a document from the document set container of FIG. 10(b).

Referring to the flow chart of FIG. 13, in order to extract a document from the DS container of FIG. 10b, the container is opened (step 1110), and the container header is read. Then, at step 1120, the document header for the first document in the container is read from the container. At step 1130, the name of the document to be extracted is compared to the name in the dname field 901, and if they are the same, the program proceeds to step 1140. If they are not the same, the program proceeds to step 1150. Assuming the current document name in the dname field is the same as the requested document, the program, at step 1140, determines whether the lifetime controls for the document are valid (e.g., whether the current date is after the expiration date). If the lifetime controls are valid, the current document is extracted. If the lifetime controls are not valid, the document is deleted. An illustrative code segment for deleting the document is shown below, wherein the function getTotalBytes( ) retrieves the document length from the document header for the current document.

```
public void nullifyDocumentContent(SdeDocumentHeader dh)
    throws IOException
{
    long bytesToNullify = dh.getTotalBytes( );
    for (long l = 0; l < bytesToNullify; l++)
    {
        write(0);
    }
}
```

If the current document is not the requested document, the program, at step 1150, skips over the current document's content, to the next document header, or the end of the envelope. Illustrative code for implementing this function is as follows:

```
public void skipDocumentContent(SdeDocumentHeader dh)
    throws IOException
{
    long bytesToSkip = dh.getTotalBytes( );
    for (long l = 0; l < bytesToSkip; l++)
    {
        int ch = read( );
    }
}
```

In this manner, the program reads past the current document so that when the program returns to step 1120, it is set to read the document header for the next document in the container.

After the document has been extracted, the last accessed field in the container header is updated (step 1160), and the updated container header overwrites the container header fields 801 through 806, (step 1170) and the container is closed (step 1180).

Tables 4 Through 5(B)

TABLE 4A

```
public static int create(String envelopefilename)
{
if ( envelopefilename == null )
{
    return(CREATE_FAIL_BAD_PARAM);
}
if ( envelopeExists(envelopefilename) )
{
    return(CREATE_FAIL_BAD_PARAM);
}
try
{
    FileOutputStream fos = new FileOutputStream(envelopefilename);
    DataOutputStream dos = new DataOutputStream(fos);
    SdeEnvelopeHeader eh = new SdeEnvelopeHeader( );
    eh.d_name          = envelopefilename;
    eh.d_created       = new Date( );
    eh.d_last_modified = new Date( );
    eh.d_last_accessed = new Date( );
    eh.writeTo(dos);
    dos.flush( );
    fos.close( );
}
```

TABLE 4B

```
public static int addDocument(
    String envelopefilename,
    String documentfilename,
    Date   expires
)
    if ( envelopefilename == null ||
         documentfilename == null ||
         expires == null )
    {
        return(ADD_FAIL_BAD_PARAM);
    }
    if ( envelopeExists(envelopefilename) == false )
    {
        create(envelopefilename);
    }
    if ( documentExists(documentfilename) == false )
    {
        return(ADD_FAIL_BAD_PARAM);
    }
    try
    {
        FileInputStream fis = new FileInputStream(envelopefilename);
        DataInputStream dis = new DataInputStream(fis);
        FileOutputStream fos = new FileOutputStream
        (envelopefilename + ".tmp");
        DataOutputStream dos = new DataOutputStream(fos);
        SdeEnvelopeHeader eh = new SdeEnvelopeHeader( );
        eh.readFrom(dis);
        eh.d_last_modified = new Date( );
        eh.d_total_documents++;
        eh.writeTo(dos);
        File file_doc = new File(documentfilename);
        long length = file_doc.length( );
        FileInputStream fis_doc = new FileInputStream(file_doc);
        SdeDocumentHeader dh = new SdeDocumentHeader( );
        dh.d_name = documentfilename;
        dh.d_expires = expires;
        dh.d_total_bytes = length;
        dh.writeTo(dos);
        while ( true )
        {
            int ch = fis_doc.read( );
            if ( ch == -1 )
                break;
            ch ^= 65;
            dos.write(ch);
        }
        fis_doc.close( );
```

TABLE 4B-continued

```
        dos.flush( );
        fos.close( );
        fis.close( );
        File file_orig = new File(envelopefilename);
        file_orig.delete( );
        File file_new = new File(envelopefilename + ".tmp");
        file_new.renameTo(file_orig);
    }
    catch ( IOException ioe )
    {
        return(ADD_FAIL_IOEXCEPTION);
    }
    return(ADD_OK);
}
```

TABLE 4C

```
class SdeEnvelopeHeader
{
    public String  d_name           = null;
    public Date    d_created        = null;
    public Date    d_last_modified  = null;
    public Date    d_last_accessed  = null;
    public long    d_total_documents = 0;
    public boolean writeTo(DataOutputStream dos)
        throws IOException
    {
        dos.writeUTF(d_name);
        dos.writeLong(d_created.getTime( ));
        dos.writeLong(d_last_modified.getTime( ));
        dos.writeLong(d_last_accessed.getTime( ));
        dos.writeLong(d_total_documents);
        return(true);
    }
    public boolean readFrom(DataInputStream dis)
        throws IOException
    {
        d_name = dis.readUTF( );
        long c = dis.readLong( );
        d_created = new Date(c);
        long lm = dis.readLong( );
        d_last_modified = new Date(lm);
        long la = dis.readLong( );
        d_last_accessed = new Date(la);
        d_total_documents = dis.readLong( );
        return(true);
    }
}
```

TABLE 4D

```
class SdeDocumentHeader
{
    public String  d_name        = null;
    public Date    d_expires     = null;
    public long    d_total_bytes = 0;
    public boolean writeTo(DataOutputStream dos)
        throws IOException
    {
        dos.writeUTF(d_name);
        dos.writeLong(d_expires.getTime( ));
        dos.writeLong(d_total_bytes);
        return(true);
    }
    public boolean readFrom(DataInputStream dis)
        throws IOException
    {
        d_name = dis.readUTF( );
        long e = dis.readLong( );
        d_expires = new Date(e);
        d_total_bytes = dis.readLong( );
        return(true);
    }
```

TABLE 4D-continued

```
}
```

TABLE 5A

```
public static int VIEW_OK = 0;
public static int VIEW_FAIL_BAD_PARAM = 1;
public static int VIEW_FAIL_IOEXCEPTION = 2;
public static int view(String envelopefilename, PrintStream ps)
{
    if ( envelopefilename == null || ps == null )
    {
        return(VIEW_FAIL_BAD_PARAM);
    }
    if ( envelopeExists(envelopefilename) == false )
    {
        return(EXTRACT_FAIL_BAD_PARAM);
    }
    try
    {
    FileInputStream fis = new FileInputStream(envelopefilename);
    DataInputStream dis = new DataInputStream(fis);
    SdeEnvelopeHeader eh = new SdeEnvelopeHeader( );
    eh.readFrom(dis);
    ps.println("Envelope:    '" + eh.d_name + "'.");
    ps.println("Created:     " + eh.d_created.toString( ));
    ps.println("Last modified: " + eh.d_last_modified.toString( ));
    ps.println("Last accessed: " + eh.d_last_accessed.toString( ));
    ps.println("Contains:    " + eh.d_total_documents + " document(s).");
        fis.close( );
    }
    catch ( IOException ioe )
    {
        return(VIEW_FAIL_IOEXCEPTION);
    }
    return(VIEW_OK);
}
```

TABLE 5B

```
public static int extractDocument(String envelopefilename, String documentfilename)
{
    if ( envelopefilename == null || documentfilename == null )
    {
        return(EXTRACT_FAIL_BAD_PARAM);
    }
    if ( envelopeExists(envelopefilename) == false )
    {
        return(EXTRACT_FAIL_BAD_PARAM);
    }
    boolean valid        = true;
    int     invalid_reason = EXTRACT_FAIL_UNKNOWN;
    try
    {
        FileInputStream fis = new FileInputStream(envelopefilename);
        DataInputStream dis = new DataInputStream(fis);
        SdeEnvelopeHeader eh = new SdeEnvelopeHeader( );
        eh.readFrom(dis);
        SdeDocumentHeader dh = new SdeDocumentHeader( );
        dh.readFrom(dis);
        if (dh.d_name.equalsIgnoreCase(documentfilename) == false)
        {
            valid = false;
            invalid_reason = EXTRACT_FAIL_NOT_FOUND;
        }
        if ( dh.d_expires.before(new Date( )) )
        {
            valid = false;
            invalid_reason = EXTRACT_FAIL_INVALID;
        }
```

TABLE 5B-continued

```
        File file_doc = new File(documentfilename);
        if (file_doc.exists( ) )
        {
            file_doc = new File(documentfilename + ".x");
        }
        FileOutputStream fos_doc = null;
        if ( valid )
        {
            fos_doc = new FileOutputStream(file_doc);
        }
        for (long l = 0; l < dh.d_total_bytes; l++)
        {
            int ch = dis.read( );
            if ( valid )
            {
                ch ^= 65;
                fos_doc.write(ch);
            }
        }
        if ( valid )
        {
            fos_doc.close( );
        }
        fis.close( );
    }
    catch ( IOException ioe )
    {
        return(EXTRACT_FAIL_IOEXCEPTION);
    }
    if ( valid )
    {
        return(EXTRACT_OK);
    }
    else
    {
        return(invalid_reason);
    }
}
```

It should be noted, however, that while the exemplary embodiments shown above provide a Java stream-based approach to virtual containers, with a relatively simple Graphical User Interface, a simple encryption technique, and lifetime controls which comprise an expiration date, it should be noted that the invention encompasses a broad array of additional implementations which may be simpler or more complex. In this regard, the user interface could comprise a more complex GUI, or could comprise a simple command line interface without graphics. Similarly, the virtual containers could also be implemented using the Java serialization mechanism, or could be implemented in another language altogether, such as C++. The lifetime controls, moreover, could be modified to be a function of the number of times a document has been extracted or the number times it has been modified. Moreover, the lifetime controls can be used to convert the document to a read-only document after a specified period of time or to prevent the document from being copied or printed.

Internet Commerce Application of Virtual Containers

In accordance with another embodiment of the invention, an Internet commerce system is provided which employs the virtual containers. In accordance with this embodiment, a party who wishes to sell an electronically transmittable product over the Internet places the product into a virtual container using a container creator utility which encrypts the product and sets lifetime controls for the product. In this regard, the seller may wish to allow a potential buyer to view or otherwise use the product for a limited trial period, and to destroy the product after this trial period if a purchase is not made. A potential buyer of the product who wishes to sample the product prior to purchasing it, obtains a copy of the container along with an container opener utility from the seller. The container opener utility allows the buyer to view or use the product while maintaining the product in the virtual container. The container opener utility, however, can be configured to prevent the user from printing product (or any portion thereof), from copying the product (or any portion thereof), or modifying the product. If the buyer attempts to view the product without using the container opener, he/she will be unable to decrypt the product. In any event, once the lifetime controls for the product become invalid (e.g. after a period of time specified by the seller), any subsequent attempt to open the container with the container opener will result in the destruction of the product. It should be noted that the product could be any form of electronic media which can be transmitted in digital form, including, for example, documents, photographs, images, and programs.

In accordance with a further aspect of this embodiment, the buyer can purchase the product prior to the expiration of the lifetime controls by, for example, transmitting his/her credit card information to the seller. After receiving and/or validating the payment information, the seller transmits a purchase key to the buyer. The container opener is configured to recognize the purchase key (which is preferably unique to the particular instance of the product delivered to that particular buyer), and to allow the buyer to extract the product from the container if the purchase key is valid.

Use of Software Components for Virtual Containers and Embedded Executable Modules In each of the exemplary embodiments set forth above, the self-destruction documents have been implemented in application specific programs so that a different program was used to implement a self-destruction Word™ document than a self-destruction Excel™ document. To avoid this repetitive (re-)development process, the Self Destruction Document, or for that matter, the Virtual Container system, can be implemented as a software component. A software component is an easily-reusable unit of software that typically provides one simple service.

The Component Object Model (COM) is the Microsoft standard for software component technology. It defines a standard for packaging software for easy reuse. A typical COM component contains two broad categories of content: the functionality of the component, implemented as a set of methods (functions), and descriptive information about the component and its functionality. Collectively, this content is referred to as the component's interface. It should be noted that this term is used differently than then the term "user interface." A user interface is typically a graphical display of windows, menus, buttons, and the like that allow a user to interact with the functionality of an application. An "interface", however, more broadly refers to the point(s) of entry into a unit of software (the methods, or functions).

COM components can be used to implement user interface elements, such as buttons and lists. They can also be used to provide services without a user interface. For example, a COM component could provide mathematical functions to compute sines and cosines.

Although there are subtle technical differences between components and objects, they represent two very similar concepts. As such, this document uses the terms interchangeably in conformance with the idiom of the trade press and technical reference material.

Further, the term control is often used to describe a component that does have a user interface associated with it. In particular, Microsoft uses the term ActiveX Control to describe a special class of COM components that typically have user interfaces.

When a COM component is used to extend the functionality of an existing application, the component is said to be embedded in that application's document. Such a component is often referred to as an embedded object. In this regard, we note that Word 97™, Excel™, and Outlook98™ each include support for Visual Basic applications through a library of COM objects.

Application extensions implemented with embedded object techniques generally require the COM component to be installed on the document author's computer. Further, any user that receives a copy of the document must also generally have the COM component installed on his or her computer to utilize the extended functionality.

In broad strokes, a COM component for a virtual container can be implemented as follows.

1. First, specify the interface for the component. The interface describes each of the services offered by the component. In the case of an SDE component, the services might include CreateEnvelope, AddDocumentToEnvelope, and ExtractDocumentFromEnvelope.
2. Implement each of the services of the component, using a programming language such as C++, Java, or Visual Basic.
3. Use the programming language's development tool to create the COM component.
4. Install the COM component on the user's workstation. Implement the small amount of scripting require to invoke the component's services.

It should be noted, however, that the Microsoft COM component standard has been described herein, software components standards promulgated by other manufacturers may also be used.

While there have been described what are presently believed to be the preferred embodiments of the invention, those skilled in the art will realize that changes and modifications may be made thereto without departing from the spirit of the invention. It is intended to claim all such modifications that fall within the scope of the invention.

What is claimed is:

1. A method for creating a virtual container containing a digital object, comprising the steps of
creating a virtual container, the virtual container residing in contiguous locations in an electronic storage media of a computer, the virtual container including a header portion and a digital object portion;
selecting a digital object for insertion into the virtual container;
applying an encryption technique to the digital object to create an encrypted digital object;
writing the encrypted digital object into the digital object portion;
selecting at least one lifetime control, including an expiration date and a limited number of times that the digital object may the opened, for the digital object; and
writing information indicative of the at least one lifetime control of said digital object, including an expiration date and the limited number of times that the digital object may be opened, into the header portion of the virtual container.

2. The method of claim 1, wherein the step of creating the virtual container includes the step of creating a container header and a digital object header, the container header containing information regarding the container including a container name, the digital object header containing information regarding the digital object including a name of the digital object.

3. The method of claim 2, wherein the step of writing information indicative of the at least one lifetime control of said digital object, including the expiration date and the limited number of times that the digital object may be opened, includes writing said information into the container header.

4. The method of claim 2, wherein the step of writing information indicative of the at least one lifetime control of said digital object, including the expiration date and the limited number of times that the digital object may be opened, includes writing said information into the digital object header.

5. The method of claim 2, wherein
the step of selecting a digital object for insertion into the virtual container includes selecting a plurality of digital objects for insertion into the virtual container;
the step applying an encryption technique includes applying the encryption technique to each of the plurality of digital objects;
the step of writing the encrypted digital object into the digital object portion includes writing each of the encrypted digital objects into the digital object portion;
the step of selecting at least one lifetime control, including an expiration date and a limited number of times that the digital object may be opened, includes selecting at least one lifetime control, including an expiration date and a limited number of times that the digital object may be opened, for each of the plurality of digital objects; and
the step of writing information includes writing the information indicative of the at least one lifetime control, including the expiration date and the limited number of times that the digital object may be opened, of each one of the digital objects into a respective digital object header.

6. The method of claim 5, wherein the header portion includes the container header and the digital object headers, and wherein each digital object is located adjacent to its respective digital object header in the virtual container.

7. A method for extracting a document from a virtual container, comprising the steps of
reading information indicative of at least one lifetime control of a digital object, including an expiration date and the limited number of times that the digital object may be opened, from a header portion of a virtual container, the virtual container residing in contiguous locations in an electronic storage media of a computer, the virtual container including the header portion and a digital object portion, the digital object portion containing an encrypted digital object;
determining, based upon said lifetime control information, if the digital object is expired and if the limited number of times that the digital object may be opened has been reached;
overwriting the digital object portion of the virtual container wit null data if the digital object is expired and if the limited number of times tat the digital object may be opened has been reached; and
reading the digital object from the digital object portion and applying a decryption technique to the digital object if the digital object is not expired and if the limited number of times that the digital object may be opened has not been reached.

8. The method of claim 7, wherein wherein the digital object is a document.

9. The method of claim 7, wherein wherein the digital object is a program.

10. A virtual container system, comprising:
a container creator utility, the container creator utility creating a virtual container which resides in contiguous locations in an electronic storage media of a computer, wherein the virtual container includes a header portion and a digital object portion, the container opener utility receiving a digital object selection and at least one lifetime control selection, including an expiration date selection, from a user, the container creator applying an encryption technique to the selected digital object to create an encrypted digital object and writing The encrypted digital object into the digital object portion of the virtual container, the container creator writing information indicative of the at least one lifetime control, including the expiration date and a limited number of times that the digital object may be opened, into the header portion of the virtual container;
a container opener utility, the container opener utility reading the information indicative of the at least one lifetime control, including the expiration date and the limited number of times that the digital object may be opened, from the header portion of the virtual container, the container opener determining, based upon said Lifetime control information, if the digital object is expired; the container opener overwriting the digital object portion of the virtual container with null data if the digital object is expired and if the limited number of times that the digital object may be opened has been reached, the container opener reading the encrypted digital object from the digital object portion and applying a decryption technique to the digital object if the digital object is not expired and if the limited number of times that the digital object may be opened has not been reached.

11. The method of claim 10, wherein wherein the digital object is a document.

12. The method of claim 10, wherein wherein the digital object is a program.

13. A method for creating a virtual container and extracting a digital object from a virtual container, Wherein the method of creating the virtual container comprises the steps of
creating a virtual container, the virtual container residing in contiguous locations in an electronic storage media of a computer, the virtual container including a header portion and a digital object portion;
selecting a digital object for insertion into the virtual container;
applying an encryption technique to the digital object to create an encrypted digital object;
writing the encrypted digital object into the digital object portion;
selecting at least one lifetime control, including an expiration date and a limited number of times that the digital object may be opened, for the digital object; and
writing information indicative of the at least one lifetime control of said digital object, including the expiration date and the limited number of times that the digital object may be opened, into the header portion of the virtual container, and wherein the method for extracting the document from the virtual container, comprises the steps of reading information indicative of at least one lifetime control of a digital object, including an expiration date and the limited number of times that the digital object may be opened, from a header portion of a virtual container, determining, based upon said lifetime control information, if the digital object is expired and if the limited number of times that the digital object may be opened has been reached;

overwriting the digital object portion of the virtual container with null data if the digital object is expired and if the limited number of times that the digital object maybe opened has been reached; and reading the digital object from the digital abject portion and applying a decryption technique to the digital object if the digital object is not expired and if the limited number of times that the digital object may be opened has not been reached.

14. The method of claim 13, wherein the step of creating the virtual container includes the step of creating a container header and a digital object header, the container header containing information regarding the container including a container name, the digital object header containing information regarding the digital object including a name of the digital object.

15. The method of claim 14, wherein the step of writing information indicative of the at least one lifetime control of said digital object, including the expiration date and the limited number of times that the digital object maybe opened, includes writing said information into the container header.

16. The method of claim 14, wherein the step of writing information indicative of the at least one lifetime control of said digital object, including the expiration date and the limited number of times that the digital object may be opened, includes writing said information into the digital object header.

17. The method of claim 14, wherein the step of selecting a digital object for insertion into the virtual container includes selecting a plurality of digital objects for insertion into the virtual container;

the step applying an encryption technique includes applying the encryption technique to each of the plurality of digital objects;

the step of writing the encrypted digital object into the digital object portion includes writing each of the encrypted digital objects into the digital object portion;

the step of selecting at least one lifetime control, including an expiration date and a limited number of times that the digital object may be opened, includes selecting an expiration date and a limited number of times that the digital object may be opened for each of the plurality of digital objects; and the step of writing information includes writing the information indicative of the at least one lifetime control, including the expiration date and the limited number of times that the digital object may be opened, of each one of the digital objects into a respective digital object header.

18. The method of claim 17, wherein the header portion includes the container header and the digital object headers, and wherein each digital object is located adjacent to its respective digital object header in the virtual container.

19. The method of claim 13, wherein wherein the digital object is a document.

20. The method of claim 13, wherein wherein the digital object is a program.

21. A method for transmitting a destructible digital object to a recipient, comprising the steps of creating a virtual container, the virtual container residing in contiguous locations in an electronic storage media of a computer, the virtual container including a header portion and a digital object portion;

selecting a digital object for insertion into the virtual container;

applying an encryption technique to the digital object to create an encrypted digital object;

writing the encrypted digital object into the digital object portion;

selecting at least one lifetime control, including an expiation date and a limited number of times tat the digital object may be opened, for the digital object;

writing information indicative of at least one lifetime control, including the expiration date and the limited number of times that the digital object may be opened, into the header portion of the virtual container, transmitting the virtual container and a container opener utility to a recipient, wherein the container opener utility, when invoked by the recipient, reads the information indicative of at least one lifetime control, including the expiration date and the limited number of times that the digital object may be opened, from the header portion of the virtual container, determines, based upon said information, if the digital object is expired and if the limited number of times that the digital object may be opened has been reached, overwrites the digital object portion of the virtual container with null data if the digital object is expired and if the limited number of times that the digital object may be opened has been reached, and reads the encrypted digital object from the digital object portion and applies a decryption technique to the digital object if the digital object is not expired and if the limited number of times that the digital object may be opened has not been reached.

22. The method of claim 21, wherein the virtual container is transmitted via the Internet.

23. The method of claim 21, wherein wherein the digital object is a document.

24. The method of claim 21, wherein wherein the digital object is a program.

* * * * *